(12) United States Patent
White et al.

(10) Patent No.: US 11,580,116 B2
(45) Date of Patent: Feb. 14, 2023

(54) VIEWPORT LOCATION BASED METHOD AND APPARATUS FOR GENERATION AND PROMOTION OF TYPE AHEAD RESULTS IN A MULTI-SOURCE AGRICULTURAL PARCEL SEARCH

(71) Applicant: CIBO TECHNOLOGIES, INC., Cambridge, MA (US)

(72) Inventors: Samuel P. White, Minneapolis, MN (US); Garrett M. Kolpin, Apple Valley, MN (US)

(73) Assignee: CIBO Technologies, Inc., Cambridge, MA (US)

( * ) Notice: Subject to any disclaimer, the term of this patent is extended or adjusted under 35 U.S.C. 154(b) by 398 days.

(21) Appl. No.: 16/923,276

(22) Filed: Jul. 8, 2020

(65) Prior Publication Data

US 2022/0012254 A1 Jan. 13, 2022

(51) Int. Cl.
| | |
|---|---|
| *G06F 16/245* | (2019.01) |
| *G06F 16/2457* | (2019.01) |
| *G06F 16/248* | (2019.01) |
| *G06F 40/174* | (2020.01) |
| *G06Q 50/16* | (2012.01) |
| *G06F 3/0482* | (2013.01) |
| *G06Q 50/02* | (2012.01) |
| *H04L 67/01* | (2022.01) |

(52) U.S. Cl.
CPC ...... *G06F 16/24578* (2019.01); *G06F 16/248* (2019.01); *G06F 16/24575* (2019.01); *G06F 40/174* (2020.01); *G06Q 50/16* (2013.01); *G06F 3/0482* (2013.01); *G06Q 50/02* (2013.01); *H04L 67/01* (2022.05)

(58) Field of Classification Search
CPC ......... G06F 16/24578; G06F 16/24575; G06F 16/248; G06F 40/174; G06F 3/0482; G06Q 50/16; H04L 67/01
See application file for complete search history.

(56) References Cited

U.S. PATENT DOCUMENTS

| | | |
|---|---|---|
| 7,415,356 B1 | 8/2008 | Gowda et al. |
| 9,213,461 B2 | 12/2015 | Eraker et al. |

(Continued)

*Primary Examiner* — Truong V Vo
(74) *Attorney, Agent, or Firm* — Richard K. Huffman; Huffman Patent Group, LLC

(57) ABSTRACT

An automated method for search includes: receiving search characters and a viewport location on a displayed geographic area corresponding to an area of interest; simultaneously searching a first entry source and a second entry source to obtain corresponding first suggested entries and second suggested entries, where the first suggested entries correspond to geographic locations that are closer to the viewport location; ranking the first suggested entries according to first rules of relevancy, and generating first ranked suggested entries; ranking the second suggested entries according to second rules of relevancy, and generating second ranked suggested entries; combining the first and second ranked suggested entries into a combined set of suggested entries, and ranking the combined set of suggested entries according to combined rules of relevancy, and generating combined ranked suggested entries; and transmitting the combined ranked suggested entries to a user for selection of a desired type ahead entry.

20 Claims, 13 Drawing Sheets

(56) References Cited

U.S. PATENT DOCUMENTS

| | | |
|---|---|---|
| 9,411,901 B2 | 8/2016 | Bacus et al. |
| 9,706,011 B2 | 7/2017 | Smedberg et al. |
| 10,074,111 B2 | 9/2018 | Humphries et al. |
| 10,188,049 B1 | 1/2019 | Emanuel |
| 10,521,191 B1 | 12/2019 | Puttick |
| 2015/0088902 A1 | 3/2015 | Nilsson et al. |
| 2015/0379588 A1 | 12/2015 | Ma et al. |
| 2016/0004703 A1 | 1/2016 | Angaluri et al. |
| 2018/0018404 A1 | 1/2018 | Caldwell et al. |
| 2018/0068232 A1* | 3/2018 | Hari Haran ........... G06F 3/0482 |
| 2018/0089227 A1 | 3/2018 | Reddy et al. |
| 2019/0286683 A1 | 9/2019 | Kittur et al. |
| 2019/0303451 A1 | 10/2019 | Takahashi et al. |
| 2019/0325054 A1 | 10/2019 | Farrell |
| 2020/0294642 A1 | 9/2020 | Bostic et al. |
| 2020/0401582 A1 | 12/2020 | Kumar |

\* cited by examiner

METHOD FOR SEARCH AND PRESENTATION OF RELEVANT RESULTS

ENTRY OF VALUATION PARAMETERS AND SAMPLED AGGREGATED RESULTS

FIG. 9 ENTRY OF ADDITIONAL ACREAGE PARAMETERS AND SAMPLED AGGREGATED RESULTS

FIG. 10　ENTRY OF ADDITIONAL CROP PARAMETERS AND UNSAMPLED AGGREGATED RESULTS

SAMPLED AGGREGATED RESULTS FOR IOWA

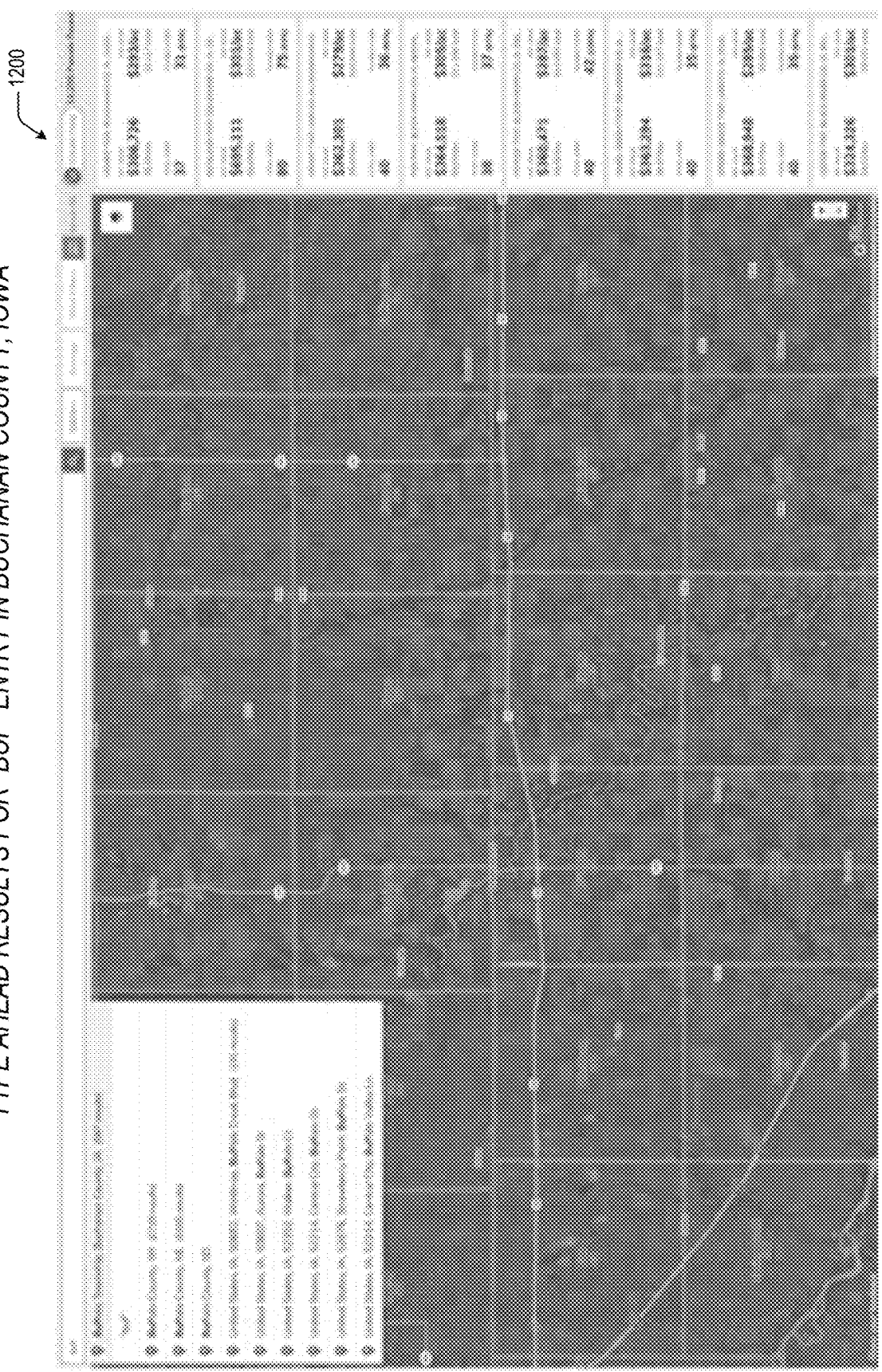
FIG. 12  TYPE AHEAD RESULTS FOR "BUF" ENTRY IN BUCHANAN COUNTY, IOWA

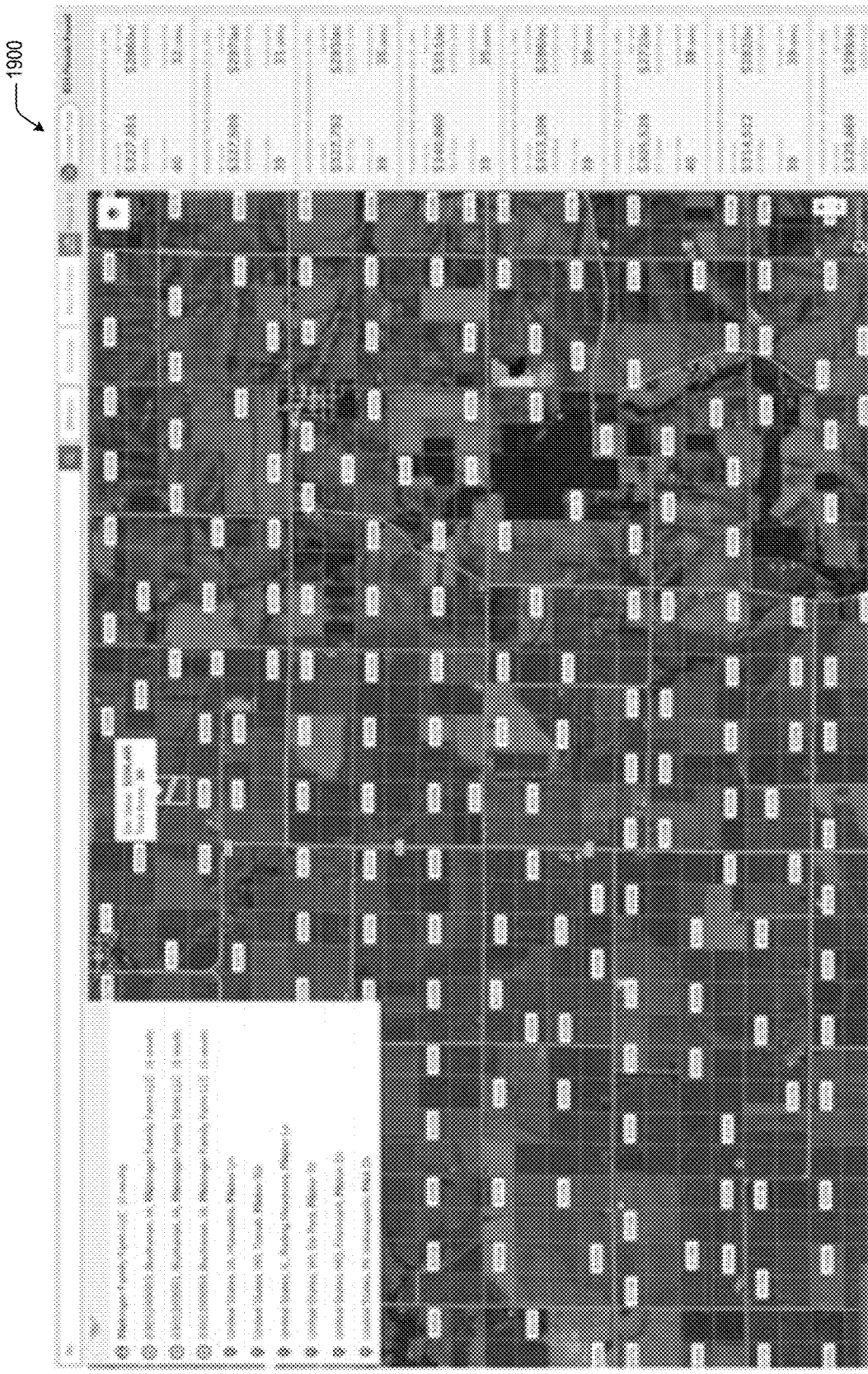
FIG. 13  TYPE AHEAD RESULTS FOR "FLIC" ENTRY IN BUFFALO TOWNSHIP, BUCHANAN COUNTY, IOWA

VIEWPORT LOCATION BASED METHOD AND APPARATUS FOR GENERATION AND PROMOTION OF TYPE AHEAD RESULTS IN A MULTI-SOURCE AGRICULTURAL PARCEL SEARCH

CROSS-REFERENCE TO RELATED APPLICATIONS

This application is related to the following co-pending U.S. patent applications, each of which has a common assignee and common inventors, the entireties of which are herein incorporated by reference.

| SERIAL NUMBER | FILING DATE | TITLE |
| --- | --- | --- |
| (CIBO.2007) | — | VIEWPORT LOCATION BASED METHOD AND APPARATUS FOR GENERATION AND PROMOTION OF TYPE AHEAD RESULTS IN A MULTI-SOURCE AGRICULTURAL PARCEL SEARCH |
| (CIBO.2008) | — | METHOD AND APPARATUS FOR GENERATION AND PROMOTION OF TYPE AHEAD RESULTS IN A MULTI-SOURCE AGRICULTURAL PARCEL SEARCH |

BACKGROUND OF THE INVENTION

Field of the Invention

This invention relates in general to the field of large-scale queries, and more specifically to methods and apparatus for rapid search for agricultural parcels and generation of relevant search results. to estimate the value of a particular agricultural parcel using comparable sales prices alone, for the value of the particular parcel is highly correlated with the unique properties of that parcel that support the parcel's ability to be profitable. As one skilled in the art will appreciate, the profitability of agricultural parcels is a function of weather conditions, location and topography, how the productive activities have been previously managed, and how the productive activities are currently managed. The skilled artisan will also appreciate that there is plethora of information of this sort that is both publicly available, and thus a single agricultural parcel may have fifty or more properties (i.e., features) that characterize the parcel and which may be used to compare it with other parcels. In addition to geographic properties, other feature properties may include, but are not limited to, total acreage, tillable acreage, assessed value per acre, tax amount per acre, market value per acre, productivity metrics, distance from water, operating practices, historical crop types, stability metrics, historical management practices, irrigation practices, etc.

Because of the substantial number of properties that are required to characterize agricultural parcels, providing users of an automated search system with the ability to rapidly search for parcels that satisfy multiple geographic and feature properties in a manner that is scalable is a significant challenge which the present inventors have noted. With over 15 million agricultural parcels within the continental United States alone, as one skilled in the art will appreciate, to perform an automated multiple property search of these parcels would result in latencies that are unacceptable for both type ahead results from freeform property entries and display of subsequent query results.

Accordingly, what is needed is an automated method and apparatus to search for agricultural parcels that is significantly faster than that which has heretofore been provided.

In addition, what is needed is a method and apparatus for generation and promotion of type ahead results in a multi-source agricultural parcel search.

What is furthermore needed is a viewport location based method and apparatus for generation and promotion of type ahead results in a multi-source agricultural parcel search.

SUMMARY OF THE INVENTION

The present invention, among other applications, is directed to solving the above-noted problems and addresses other problems, disadvantages, and limitations of the prior art by providing a superior technique for rapidly searching an automated agricultural database and for generating relevant results. In one embodiment, an automated method for search and generation of relevant search results is provided, the method including: receiving freeform search characters input by a user and a viewport location on a displayed geographic area corresponding to an area of interest to the user; simultaneously searching a first freeform entry source and a second freeform entry source to obtain corresponding first suggested freeform entries and second suggested freeform entries, where the first suggested freeform entries correspond to geographic locations that are closer to the viewport location; ranking the first suggested freeform entries according to first rules of relevancy to the user, and generating first ranked suggested freeform entries; ranking the second suggested freeform entries according to second rules of relevancy to the user, and generating second ranked suggested freeform entries; combining the first and second ranked suggested freeform entries into a combined set of suggested freeform entries, and ranking the combined set of suggested freeform entries according to combined rules of relevancy to the user, and generating combined ranked suggested freeform entries; and transmitting the combined ranked suggested freeform entries to the user for selection of a desired type ahead entry.

One aspect of the present invention contemplates a computer-readable storage medium storing program instructions that, when executed by a computer, cause the computer to perform an automated method for search and generation of relevant search results, the method including: receiving freeform search characters input by a user and a viewport location on a displayed geographic area corresponding to an area of interest to the user; simultaneously searching a first freeform entry source and a second freeform entry source to obtain corresponding first suggested freeform entries and second suggested freeform entries, where the first suggested freeform entries correspond to geographic locations that are closer to the viewport location; ranking the first suggested freeform entries according to first rules of relevancy to the user, and generating first ranked suggested freeform entries; ranking the second suggested freeform entries according to second rules of relevancy to the user, and generating second ranked suggested freeform entries; combining the first and second ranked suggested freeform entries into a combined set of suggested freeform entries, and ranking the combined set of suggested freeform entries according to combined rules of relevancy to the user, and generating combined ranked suggested freeform entries; and transmitting the combined ranked suggested freeform entries to the user for selection of a desired type ahead entry.

Another aspect of the present invention comprehends an automated system for search and generation of relevant search results, the automated system including: a search component, configured to receive from a user interface component freeform search characters and a viewport location on a displayed geographic area, where the freeform search characters are entered by a user, and where the viewport location corresponds to an area of interest to the user, the search component including: a first freeform entry source and a second freeform entry source, where the search component directs the first freeform entry source and the second freeform entry source to simultaneously obtain corresponding first suggested freeform entries and second suggested freeform entries, where the first suggested freeform entries correspond to geographic locations that are closer to the viewport location; and a relevancy controller, coupled to the first and second freeform entry sources, configured to rank the first suggested freeform entries according to first rules of relevancy to the user to generate first ranked suggested freeform entries, and configured to rank the second suggested freeform entries according to second rules of relevancy to the user to generate second ranked suggested freeform entries, and configured to combine the first and second ranked suggested freeform entries into a combined set of suggested freeform entries, and configured to rank the combined set of suggested freeform entries according to combined rules of relevancy to the user to generate combined ranked suggested freeform entries, and configured to transmit the combined ranked suggested freeform entries to the user interface component for selection of a desired type ahead entry by the user.

BRIEF DESCRIPTION OF THE DRAWINGS

These and other objects, features, and advantages of the present invention will become better understood with regard to the following description and accompanying drawings where:

FIG. 12 is a diagram featuring an exemplary display provided to a client device showing type ahead results for parcels valued at greater than $6,000 per acre having a viewport centroid in Buchanan County, Iowa, where a user has entered the string "buf"; and FIG. 13 is a diagram showing an exemplary display provided to a client device showing type ahead results for parcels valued at greater than $6,000 per acre having a viewport centroid in Buffalo Township, Buchanan County, Iowa, where a user has entered the string "flic".

DETAILED DESCRIPTION

Figure 1:
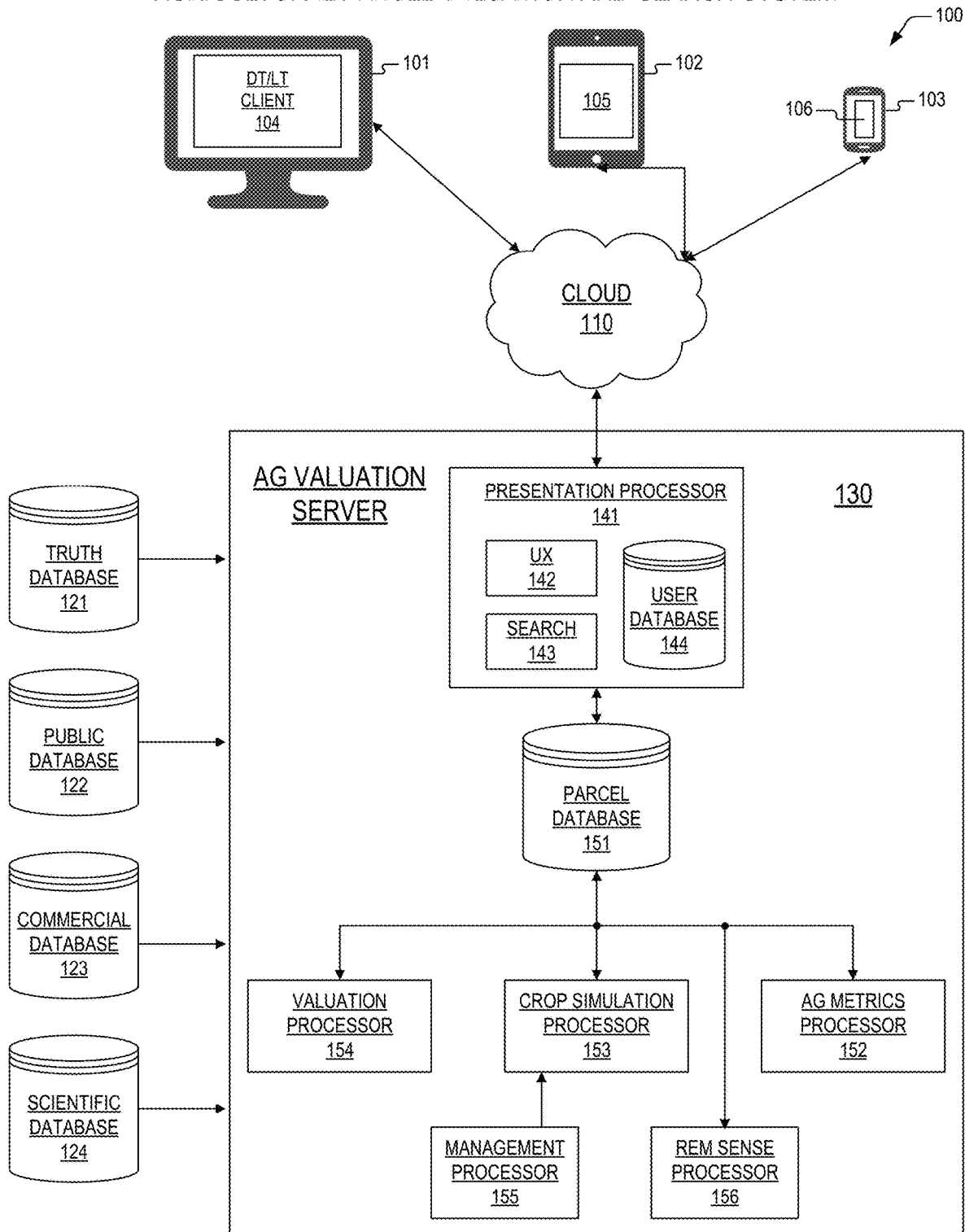
FIG. 1 is a block diagram illustrating an agricultural parcel search and valuation system according to the present invention.

Exemplary and illustrative embodiments of the invention are described below. It should be understood at the outset that, although exemplary embodiments are illustrated in the figures and described below, the principles of the present disclosure may be implemented using any number of techniques, whether currently known or not. In the interest of clarity, not all features of an actual implementation are described in this specification, for those skilled in the art will appreciate that in the development of any such actual embodiment, numerous implementation-specific decisions are made to achieve specific goals, such as compliance with system-related and business-related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. Unless otherwise specifically noted, articles depicted in the drawings are not necessarily drawn to scale.

The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase. As used in this disclosure, "each" refers to each member of a set, each member of a subset, each member of a group, each member of a portion, each member of a part, etc.

Applicants note that unless the words "means for" or "step for" are explicitly used in a particular claim, it is not intended that any of the appended claims or claim elements are recited in such a manner as to invoke 35 U.S.C. § 112(f).

Definitions

Central Processing Unit (CPU): The electronic circuits (i.e., "hardware") that execute the instructions of a computer program (also known as a "computer application," "application," "application program," "app," "computer code," "code process," "code segment," or "program") by performing operations on data that may include arithmetic operations, logical operations, and input/output operations. A CPU may also be referred to as a processor In view of the above background discussion on how agricultural land parcels are presently characterized, a discussion of the present invention will be provided with reference to FIGS. 1-13. The present invention overcomes the problems associated with present-day automated search techniques by providing automated methods and apparatus that enable a user to enter discrete search parameter along with freeform search parameters, where the latencies corresponding to freeform type ahead suggestions and subsequent display of query results are acceptable.

Though the novel innovations disclosed herein may be disposed within any type of apparatus or method that provides for rapid type ahead results and display of query result when searching for agricultural parcels having many geographic feature descriptors, for clarity sake the present invention will be presented within the context of a system that is employed both for search of agricultural parcels and for translating certain feature parameters into valuation metrics for the parcels, so that users can better determine valuation of parcels within a given region, state, county, and township.

Referring to FIG. 1, a block diagram is presented illustrating an agricultural parcel search and valuation system 100 according to the present invention. The system 100 may include an agricultural valuation server 130 that is coupled to one or more client devices 101-103 through the internet cloud 110. The client devices 101-103 may include one or more desktop/laptop computers 101 that execute desktop/laptop client applications 104 for communication and interaction with the valuation server 130 through the internet cloud 110. The client devices 101-103 may also include one or more smart tablet computers 102 that execute tablet client applications 105 for communication and interaction with the valuation server 130 through the internet cloud 110. The client devices 101-103 may further include one or more smartphone devices 103 that execute smartphone client applications 106 for communication and interaction with the valuation server 130 through the internet cloud 110.

The valuation server 130 is coupled to a truth database 121, a public database 122, a commercial database 123, and a scientific database 124. Though represented in the block diagram as single databases 121-124, each of the databases 121-124 may comprise a substantial number of databases through which the valuation server 130 may access truth-based data, public data, commercial data, and scientific data in order to translate this data into agriculturally meaningful metrics and valuations for a vast number of agricultural parcels.

Preferably, truth-based data includes field trial results that are the measurements taken by farming partners who plant and harvest crops under a wide range of specified scenarios. These field trial results are employed by the valuation server 130 to test and improve the accuracy of crop simulations that may be performed to generated metrics and valuations for similar parcels, and that are employed to scale simulations to entire growing regions.

Public data comprises a wide variety of sources such as, but not limited to, county records, United States Department of Agriculture monthly reports; parcel geographic coordinates data and topography; soil types and layering (e.g., Soil Survey Geographic Database (SSURGO); historical crop planting harvesting, and yield data; soil type indexes (e.g., Corn Stability Rating 2 (CSR2); historical and historical and forecasted weather data; and satellite and aerial image data taken across agriculturally meaningful spectral band (e.g., LANDSAT, SENTINEL) that may be processed by the valuation server 130 to understand crop types, rotations, key management practices (e.g., planting dates, tillage dates, fertilization dates, harvesting dates), and stages of growth at any given time.

Commercial data may comprise any of the public data that is aggregated or formatted for ease of access by the valuation server 130.

Scientific data may comprise selected results of global scientific results taken from published literature. The results are provided to the valuation server 130 to validate crop simulations and to ensure that the simulations are accurate across a wide range of management scenarios and weather conditions. In one embodiment, crop simulation results are compared to scientific research data obtained under similar management practices and weather conditions.

The agricultural valuation server 130 may include a presentation processor 141 that is coupled to a parcel database 151. The presentation processor 141 comprises a user interface (UX) component 142, a search engine component 143, and a user database 144.

The valuation server 130 may further comprise an agricultural metrics processor 152, a crop simulation processor 153, and a valuation processor 154, all of which are coupled to the parcel database 151. The valuation server 130 may further comprise a remote sense processor 156 that is coupled to a management practices processor 155 and to the agricultural metrics processor 152. The management practices processor 155 is coupled to the crop simulation processor 153.

In operation, records corresponding to agricultural parcels in a region are created, iterated, and revised as a function of newly available data from one or more of the databases 121-124 and applicable results from recent crop simulations performed by the crop simulation processor 153. The records are stored in the parcel database 151 for access by the agricultural metrics processor 152, the valuation processor 154, and the presentation processor 141. Users may execute the client applications 104-106 on the client devices 101-103 to specify constraints, weights, freeform search parameters, and discrete search parameters for one or more parcel records stored within the parcel database 151. The user interface processor 142 executes in order to transmit display windows to the client devices 101-103 via their respective client applications 104-106 to enable the users to specify the constraints, weights, and freeform/discrete search parameters. The client applications 104-106 may transmit the constraints, weights, and freeform/discrete search parameters to the presentation processor 141 through the internet cloud 141. In one embodiment, the constraints, weights, freeform search parameters, and discrete search parameters are stored in corresponding user records within the user database 144 to accelerate subsequent searches. Upon receipt of the constraints, weights, freeform search parameters, and discrete search parameters, the search engine processor 143 may perform pre-searches of freeform parameter entries by the user, and may cause the presentation processor 141 to transmit suggested freeform parameter entries to the user via the internet cloud. The user may accept one of the suggested freeform parameter entries or the user may continue entering freeform entry characters. The additional characters are transmitted to the presentation processor 141 and the search engine processor 143 may revise suggested freeform entries and cause the entries to be displayed to the user. The user may continue to add freeform characters, resulting in more refine freeform parameter suggestions by the search engine processor 143, or the user may delete some characters and add different characters. In one embodiment, suggestions of a plurality of freeform entries based upon characters entered by the user are transmitted for display to the user in less than 100 milliseconds.

Upon selection of a suggested freeform entry, the search engine processor 143 may execute a query of the parcel database 151 using the suggested freeform entry and discrete search parameters to access one or more records within the parcel database 151 that satisfy the suggested freeform entry and discrete search parameters. The one or more records within the parcel database 151 that satisfy the suggested freeform entry and discrete search parameters may also be stored in corresponding user records within the user database 144 to accelerate subsequent searches, and the one or more records within the parcel database 151 that satisfy the suggested freeform entry and discrete search parameters are provided by the search engine processor 143 to the user interface processor 142, which formats the one or more records for display by the client applications 104-106 on the client devices 101-103 according to device type, and the presentation processor 141 transmits the one or more records to the client devices 101-103 along with location contextual metadata corresponding to the one or more parcels (e.g., parcels shown on a map) that enable the users to visualize and better comprehend results of their searches. In one embodiment, transmission of the one or more records to the client devices 101-103 along with contextual metadata corresponding to the one or more parcels is accomplished in less than 500 milliseconds.

In one embodiment, users may iteratively refine searches by specifying additional freeform/discrete search parameters to further target search results that are of interest, and these results are additionally stored in the corresponding user records within the user database 144.

In one embodiment, the viewport location (i.e., map location centroid) on the client devices 101-103 may be transmitted to the presentation processor 141 and stored in the user database 144 along with geographical metadata (e.g., state, county, township, PLSS coordinates, etc.) that corresponds to the viewport location. The viewport location and geographical metadata may be subsequently employed by the search processor to suggest freeform parameter entries and search query results that are deemed more relevant to the user's search over entries and results that would be provided for a less adjacent viewport location. In this manner, as will be described in more detail below, the agricultural valuation server maintains awareness of a user's location interests when searching for parcels, and employs this awareness in the suggestion of freeform parameter entries and subsequent query results.

In one embodiment, to accelerate the display of parcel record aggregations (i.e., number of parcel records within a geographic region that satisfy freeform/discrete search parameters entered by the user) the search engine processor 143 may employ sampling and normalization techniques to provide the user with an approximate number (aggregation) of parcels within each geographic region displayed to the user. In on embodiment, the parcel database 151 comprises the open source Elasticsearch index 151 that is populated with documents corresponding to each of the agricultural parcels. As one skilled in the art will appreciate, Elasticsearch is an architecture that is highly optimized to allow for rapid searches through millions of documents. Though effective for general types of searches, the present inventors have noted that Elasticsearch exhibits unacceptable latencies for limited searches of documents having a substantial number of data categories. Accordingly, as will be described in further detail below, sampling and normalization techniques are employed by the search engine processor 143 to reduce these latencies to acceptable values.

Upon selection of a specific parcel record, the presentation processor 141 may transmit fields within the records that are formatted by the user interface processor 142 for display to the user along with metadata that enable the user to visualize and comprehend the record fields associated with the parcel, thus providing the user with a substantially improved method for making an informed decision regarding a corresponding agricultural parcel based upon user category (e.g., small farmer, enterprise farming corporation, underwriter, lender, insurer, etc.).

The remote sense processor 156 may process satellite/aerial images, and may merge selected images to determine vegetative indices, to estimate missing image data, and to determine parcel crop stability zones. The management practices processor 155 may access data from the databases 121-124 corresponding to management practices associated with parcels and rank the outputs against other management practice data that is received from one or more of the databases 121-124. In turn, the management practices processor 155 may augment sparse or incomplete data in order to provide location-specific inferences for a number of key crop management practices including, but not limited to planted crop type, specific cultivar or crop variety, planting data, planting density (i.e., seeds per acre and row spacing), fertilizer application (e.g., dates and amounts), and irrigation practices. In one embodiment, highest ranked management practices are employed to construct simulation inputs to the crop simulation processor 153 for modeling of required multi-year crop simulations. For example, management practices from the truth database 121 may be ranked higher than crop simulation results. In the absence of truth data for a parcel, state guidelines or management practices rules of thumb may be employed to build directives for simulations.

The results of the crop simulations are employed by the agricultural metrics processor 152 and the valuation processor 154 to iteratively translate simulation results and data provided by the databases 121-124 into figures of merit and an agricultural valuation for every parcel within the parcel database 151. In one embodiment, the number of parcel records in the parcel database 151 comprises in excess of 15 million parcels located in the continental United States.

In one embodiment, the crop simulation processor 153 preferably comprises a mechanistic crop model such as the Systems Approach to Land Use Suitability (SALUS), the initial version of which was developed at Michigan State University and which has been the subject of 20 years of testing across hundreds of fields in 46 countries, more than 25 PhD dissertations, over 200 peer-reviewed journal articles, and thousands of academic citations. It is not the purpose of the present application to provide an in depth tutorial on mechanistic crop modeling, but rather to disclose how results of crop simulations performed by crop simulation processor 153 are translated into agricultural metrics and a corresponding agricultural valuation that enables a user to make informed and meaningful decisions for one or more parcels. For a tutorial on SALUS, the reader is directed to the publications below:

Basso, B., & Ritchie, J. T. (2015). Simulating crop growth and biogeochemical fluxes in response to land management using the SALUS model. In S. K. Hamilton, J. E. Doll, & G. P. Robertson (Eds.), *The ecology of agricultural landscapes: long-term research on the path to sustainability*. New York, N. Y., USA: Oxford University Press, 252-274;

Basso, B., Ritchie, J. T., Grace, P. R., Sartori, L. (2006). Simulation of tillage systems impact on soil biophysical properties using the SALUS model. *Italian Journal of Agronomy*, 1(4), 677. doi: 10.4081/ija.2006.677;

Albarenque, S. M., Basso, B., Caviglia, O. P., Melchiori, R. J. (2016). Spatio-temporal nitrogen fertilizer response in maize: field study and modeling approach. *Agronomy Journal*, 108(5), 2110. doi: 10.2134/agronj2016.02.0081; and Partridge, T. F., Winter, J. M., Liu, L., Kendall, A. D., Basso, B., Hydnman, D. (2019). Mid-20th century warming hole boosts U.S. maize yields. *Environmental Research Letters*. doi: 10.1088/1748-9326/ab422b The present inventors note that the crop simulation processor 153 according to the present invention is continuously improved as a function of new scientific and truth data in order to expand to different crop types and to provide scaling to address practical needs of agriculture from sub-field to continental scales. The aforementioned crop model is a subset of a larger simulation engine within the crop simulation processor 153 which uses a combination of farmer reported data, government and academic statistics, and remote sensing to build a detailed scenario that describes genotypic conditions (i.e., crop parameters representing genotypic potentials of a crop), environmental conditions (i.e., weather, physical soil properties, and chemical soil properties), and management conditions (e.g., planting dates, fertilizer application dates and amounts, tillage date, depth, and material, etc.) of a growing crop. Based on these input conditions, the crop model calculates plant growth stage, plant leaf area, solar energy absorbed through the leaves, biomass accumulated in different plant tissues, and water and nutrient uptake by the roots, and saves outputs for that day. These variables are calculated at every time step until the crop matures.

Accordingly, the crop simulation processor 153 is configured to describe development and growth of a crop within an agricultural parcel all the way from planting to maturity. Plant development describes the timing of events that occur during the plant life cycle that induce changes in growth rates and partitioning of dry matter to different plant tissues. The simulation processor 153 calculates state variables representing various aspects of development and growth at each daily time step and furthermore describes the different components of the soil layers and how these interact with the environment. Thus, the crop simulation processor 153 may estimate the amount of water and nutrients available for uptake by a growing plant. Root development occurs at each daily time step: root tips progress through the soil layers, and root mass increases. This results in water and nutrient uptake in soil horizons that are in contact with the plant's rooting system, proportional to the root mass distribution in each soil horizon. Advantageously, the crop simulations performed by the crop simulation processor 153 reflect the complex interactions whereby soil and weather influence plant growth and how plant growth subsequently changes the soil dynamic. Outputs of the crop simulation processor 153 include, but are not limited to, yields, nitrogen stress, drought stress, biomass accumulation, growth stages, nitrogen uptake, nitrogen use efficiency, and water use efficiency.

In one embodiment, freeform and discrete parameters that a user may specify to access parcel records in the parcel database 151 include, but are not limited to, growing region, state, county, zip code, Public Land Survey System (PLSS) coordinates, street/intersection, keywords, parcel owner name, parcel ID number, historical land use (e.g., crop type), land type (e.g., farm, dairy, ranch, forest, etc.), parcel acreage, tillable area, and agricultural metrics and valuations generated by the valuation server 130.

As will be described in further detail below, the agricultural metrics and agricultural valuations generated by the agricultural valuation server 130 enable a user functioning in a specific role (e.g., farmer, enterprise, underwriter, etc.) to understand the value of a particular parcel from the user's perspective, which is a significant improvement over present-day techniques that merely employ sales of comparable parcels. Depending on the user's role, agricultural metrics may be expressed as productivity of a parcel, production risk of the parcel, and the parcel's ability to be sustainably managed. For a user purely interested in farming, a parcel's productivity and stability (i.e., productivity risk) are paramount. However, for an enterprise that is focused on reducing carbon emissions, a different metric (e.g., sustainability) may take precedence. In one embodiment, the agricultural valuation assigned to a parcel employs one or more of the agricultural metrics as a function of the user's role as supplemented by comparable sales to express an agricultural value in dollars as opposed to just a value that is based on comparable parcels. Advantageously, the user is exposed to a valuation of a parcels based upon the parcel's agricultural potential, which is a substantial improvement over that which has heretofore been provided.

Figure 6:
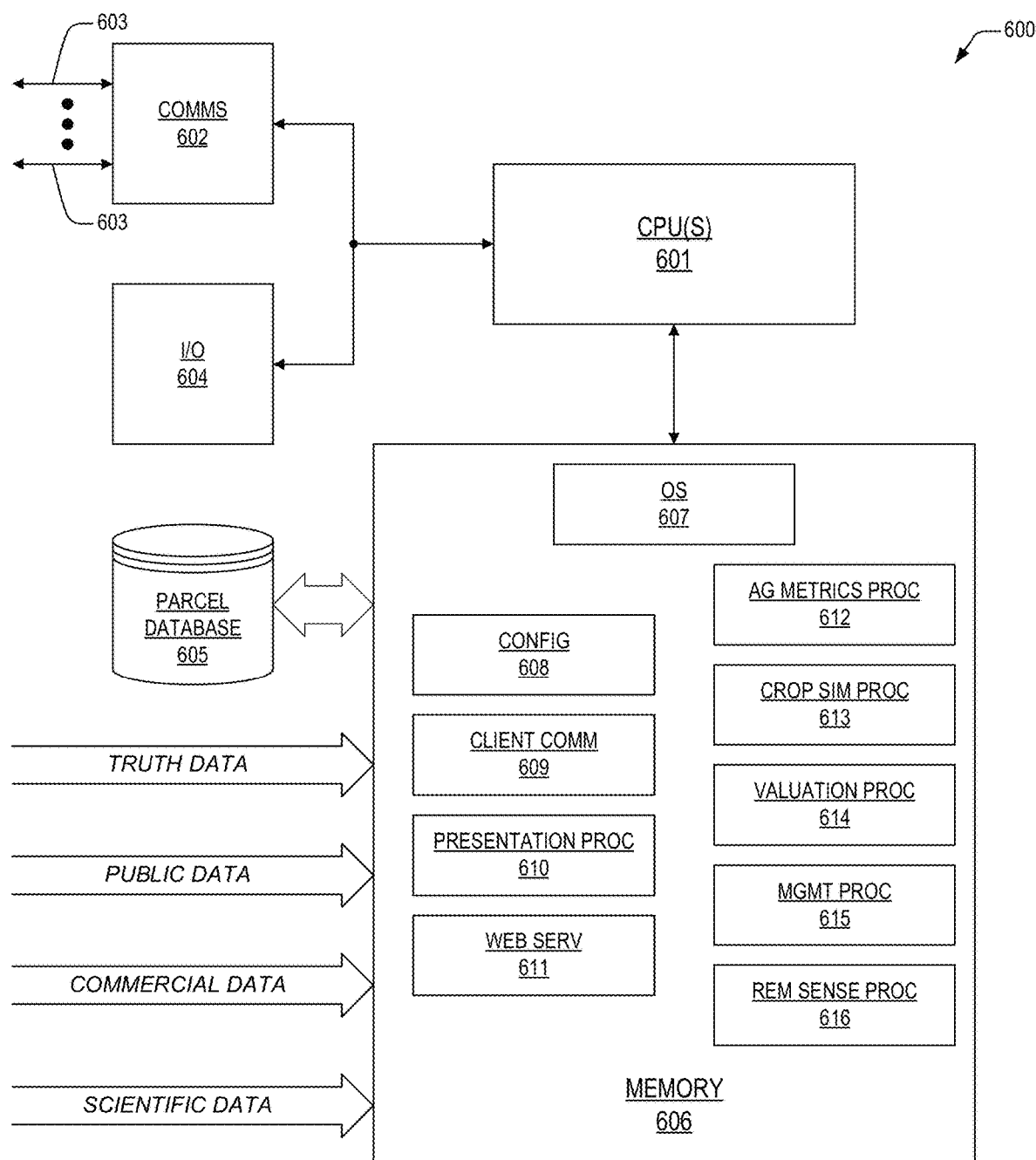
FIG. 6 is a block diagram illustrating an agricultural valuation server according to the present invention.

The valuation server 130 according to the present invention may comprise one or more application programs executing thereon to perform the operations and functions described above, and which will be disclosed in further detail with reference to FIG. 6.

Figure 2:
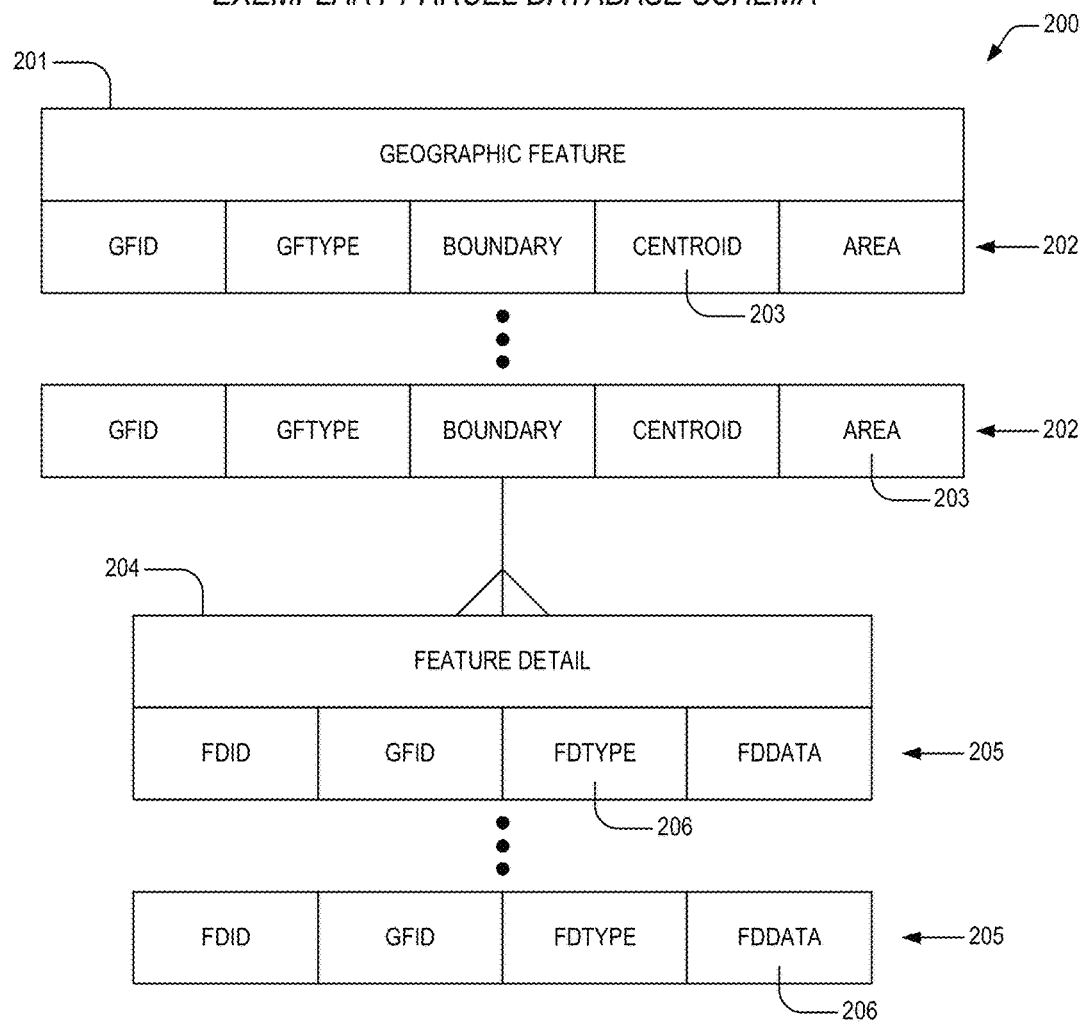
FIG. 2 is a block diagram depicting an exemplary schema for a parcel database according to the present invention.

Turning now to FIG. 2, a block diagram is presented depicting an exemplary schema for a parcel database 200 according to the present invention, such as the parcel database 151 of FIG. 1. The schema 200 may include a geographic feature table 201 that is linked to a plurality of feature detail tables 204 in a one-to-many architecture. The geographic feature table 201 may include a plurality of records 202 having a plurality of data fields 203. Each of the feature detail tables 204 may include a plurality of records 205 having a plurality of data fields 206. The plurality of data fields 203 in each of the geographic feature records 202 may include a geographic feature ID field (GFID), which is the primary key for the geographic feature table 201 and which is unique for each of the plurality of records 202. The plurality of data fields 203 in each of the geographic feature records 202 additionally include a geographic feature type field (GFTYPE), a boundary field (BOUNDARY), a centroid field (CENTROID), and an area field (AREA). GFTYPE specifies one of a plurality of geographic feature types that include, but are not limited to, parcel, county, state, and growing region. BOUNDARY includes geographic coordinates (e.g., longitude and latitude) that describe a geographic boundary for the land area corresponding to the GFID. CENTROID includes a geographic centroid coordinates for the land area corresponding to the GFID. And AREA includes the area (e.g., acres, square meters, etc.) of the land area corresponding to the GFID.

The plurality of data fields 206 in each of the feature detail records 205 include a feature detail ID field (FDID), which is the primary key for a corresponding feature detail table 204 and which is unique for each of the plurality of records 205. Each of the feature detail records 205 may also include a geographic feature type ID field (GFID), which is the foreign key that links a feature detail record 205 back to a corresponding geographic feature record 202 in the geographic feature table 201. Each of the feature detail records 205 may further include a feature detail type field (FDTYPE) and a feature detail data field (FDDATA). FDTYPE specifies one of a plurality of feature detail types that include, but are not limited to, results generated by the crop simulation processor 153 for the corresponding FDID and GFID combination, a particular agricultural metric (e.g., productivity score, stability score, sustainability score) generated by the agricultural metrics processor 152 for the corresponding FDID and GFID combination, an agricultural valuation generated by the valuation processor 154 for the corresponding FDID and GFID combination, stability zone boundaries generated by the remote sense processor 156 for the corresponding FDID and GFID combination, and descriptive metadata taken from the databases 121-124 for the corresponding FDID and GFID combination.

Accordingly, a given geographic feature (e.g., a 40-acre farm in Milford County, Iowa) may be described in the parcel database 151 in terms of its geographic boundary, centroid, and area within a record 202 in the geographic feature table 201, and this record 202 may be linked to a number of feature detail records 205 in different feature detail tables 204 that contain feature detail data for a corresponding number of feature detail types.

Figure 3:
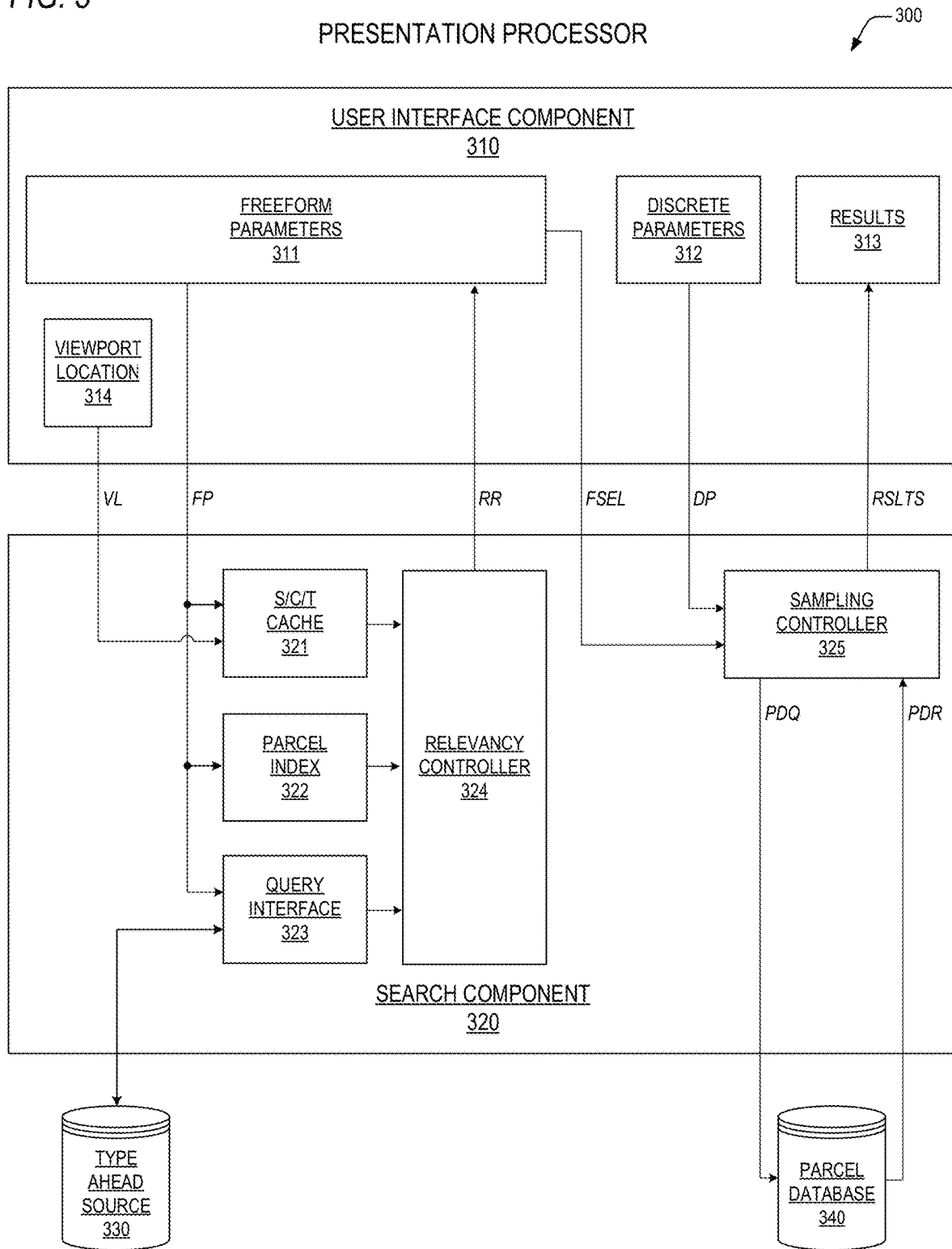
FIG. 3 is a block diagram featuring a presentation processor according to the present invention, such as may be employed in the system of FIG. 1.

Now referring to FIG. 3, a block diagram is presented featuring a presentation processor 300 according to the present invention, such as may be employed in the system of FIG. 1. The presentation processor 300 has a user interface component 310 that is coupled to a search component 320. The search component 320 is coupled to a type ahead source 330 and to a parcel database 340. In one embodiment, the type ahead source comprises a third-party street address and intersection database service such as is provided by here-.com. The third-party street address and intersection database service may comprise one of the commercial databases 123 shown in FIG. 1, where the database service is accessed over the internet cloud 110.

The user interface component 310 includes a freeform parameters processor 311, a viewport location processor 314, a discrete parameters processor 312, and a results processor 313. The search component 320 includes a relevancy controller 324 and a sampling controller 325. Multiple sources 321-323 for generation of suggested freeform parameter entries are coupled to the freeform parameters processor 311 via bus FP and to the relevancy controller 324. The multiple sources 321-323 include a state/county/township in-memory cache 321, a specialized parcel index 322, and a street/intersection query interface 323. The in-memory cache 321 is coupled to the viewport location processor 314 via bus VL. The street/intersection query interface 323 is operationally coupled to the third-party street and intersection database service ("type ahead source") 330. The relevancy controller 324 is coupled to the freeform parameters processor 311 via bus RR. The sampling controller 325 is coupled to the freeform parameters processor 311 via bus FSEL, to the discrete parameters processor 312 via bus DP, to the results processor 313 via bus RSLTS, and to the parcel database 340 via bus PDQ and bus PDR. As is described above with reference to FIG. 1, the user interface component 310 is employed within the presentation processor 300 to accept user inputs from client devices 101-103 in the form of freeform text characters and discrete parameters, to track the user's viewport location on the client devices 101-103, to display suggested and ranked freeform entries resulting from pre-searches provide by the multiple sources 321-323 and ranked for display by the relevancy controller 324, and to display subsequent query results (parcel documents and aggregations by geographic area) that satisfy search parameters entered and selected by the user.

In operation, the user may specify discrete and freeform search parameters in any order. Entered discrete parameters are provided by the discrete parameters processor 312 to the sampling controller 325 over bus DP and the sampling controller 325 executes a search of the parcel database 340 by providing these parameters over bus PDQ. Parcel documents and aggregations that satisfy the query constraints are provided by the parcel database 340 to the sampling controller 325 over bus PDR. In one embodiment, the sampling controller 325 may include a sampling threshold value for aggregation of results by geographic area that enables display of results to the user within an acceptable period of time. In one embodiment, the acceptable period of time is 500 milliseconds. Accordingly, the sampling controller 325 may direct the parcel database 340 to provide aggregations of results by geographic area prior to performing the full search, and if the aggregations of results exceeds the sampling threshold, the sampling controller 325 may direct the parcel database 340 to retrieve a sample of the results, where the sample is a percentage of the aggregations of results. Preferably, the percentage comprises 10 percent of the aggregations of results, though other embodiments of percentage are contemplated. Upon provision of the sample of aggregations of results over bus PDR, the sampling controller 325 may then normalize the sample of aggregations of results to generate estimated aggregations of results. For example, for a 10-percent sample of aggregations of results, the sampling controller 325 will scale the sampled aggregations of results by a factor of 10 to generate a normalized estimate of aggregations of results. If the aggregations of results fall below the sampling threshold, then the sampling controller 325 may direct the parcel database 340 to retrieve all results satisfying the discrete parameters. As discrete parameters are modified by the user, they are provided by the discrete parameters processor 312 to the sampling controller 325, which in turn directs the parcel database 340 to either retrieve a sample of results or all results as a function of the sampling threshold.

The query results (sampled or full) are provided by the sampling controller to the results processor 313 over bus RSLTS, whereby the user interface component 310 causes the results to be transmitted to the client devices 101-103 over the internet cloud 110. The sampling controller 325 may further receive selected suggested freeform parameter entries over bus FSEL and may employ these entries in conjunction with discrete parameters provided over bus DP to perform queries (sampled or full as a function of the sampling threshold) of the parcel database 340, providing results over RSLTS to the results processor 313.

To preclude unacceptable latencies corresponding to providing suggested freeform parameter entries to the user, freeform characters are provided as they are entered to the multiple sources 321-323 of suggested freeform entries in parallel. Accordingly, the multiple sources 321-323 simultaneously generate suggested freeform entries ("freeform hits") and provide them to the relevancy controller 234. Individually, the in-memory cache 321 comprises a table of national, state, county, and township names, abbreviations, and short forms. As the user enters freeform characters, the in-memory cache 321 generates suggested freeform entries as a function of the user's viewport location, where suggested entries are provided to the relevancy controller 324 as a function of their distance from the user's viewport location. That is, states, counties, and townships that are closest to the viewport location are provided first.

As one skilled in the art will appreciate, Elasticsearch allows per-field customization on the underlying indexes created. Accordingly, in one embodiment, the parcel database 340 comprises an Elasticsearch parcel database 340, where the parcel index 322 comprises customized indexing of the Elasticsearch parcel database 340 to enable fast lookups on prefixes matching the data, which are provided to the relevancy controller 324. The type of indices within the parcel index 322 are referred to as an "edge n-gram" index that breaks up and indexes the prefixes of terms provided by the freeform parameters processor 311. For example, a freeform parameters entry of "Hennepin County" would be assigned prefixes "h", "he", "hen", "henn", etc.— all indexed as separate terms. Within the parcel index 322, this type of autocomplete index to the following fields in the Elasticsearch parcel database 34): owner name, parcel ID, state, county, township, and PLSS coordinates (i.e., section, township, and range). According to the present invention, the prefix lengths that are computed for each of the indices are varied to increase type ahead performance and relevancy of results.

The third-party street intersection query interface 323, as described above, accesses a third-party street/intersection type ahead source 330 to retrieve street and intersection freeform entry suggestions, which are provided to the relevancy controller 324.

The relevancy controller 324 operates to score and rank suggested freeform entries provided by the multiple sources 321-323, and to transmit ranked suggested freeform entries for display to the users via the freeform entry processor 311, where the ranked suggested freeform entries are provided as a function of relevancy to the user. In one embodiment, the number of ranked suggested freeform entries ranges from one to twenty. The relevancy controller 324 may rank entries provided by each of the multiple sources 321-323 according to relevancy rules, as will be described in further detail below, to determine and generate suggested freeform entries.

As the user continues to type characters, updated suggested freeform entries are provided in parallel by the multiple sources 321-323 and are ranked by the relevancy controller 324 and transmitted to the freeform entry processor 311. As noted above, when the user selects a suggested freeform entry from those displayed, it is provided to the sampling controller 325 over bus FSEL, which combines the selected freeform entry along with entered discrete parameter, and which directs the parcel database 340 to search for matching parcels.

Figure 4:
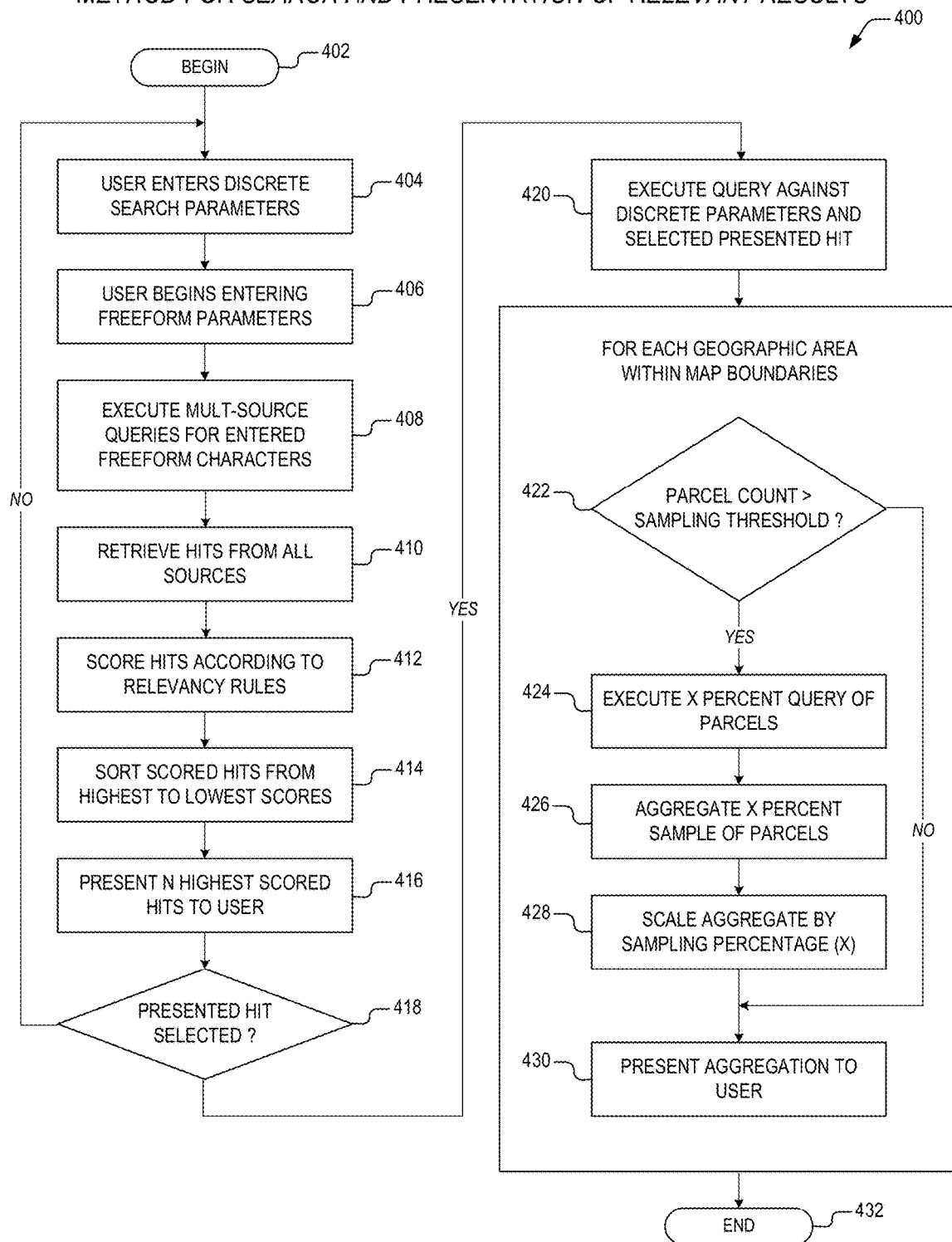
FIG. 4 is a flow diagram showing a method for search and presentation of relevant results according to the present invention, such as may be employed by the presentation processor of FIG. 3.

Now turning to FIG. 4, a flow diagram 400 is presented showing a method for search and presentation of relevant results according to the present invention, such as may be employed by the presentation processor of FIG. 3. Flow begins at block 402, where an initial viewport location is presented to the user along with fields for entry of discrete and freeform search parameters. Flow then proceeds to block 404.

At block 404, the user enters discrete search parameters via the discrete parameters processor 312 which are transmitted to the sampling controller 325. As noted above, the discrete parameters may include, but are not limited to, a range of agricultural valuation, a range of lease valuation, a range of parcel acreage, a range of tillable acreage, a range of a parcel productivity metric, a range of a parcel stability metric, a range of a parcel sustainability metric, a selection of land type, and a selection of historical land use by crop. The user may enter one or more of these discrete search parameters. Flow then proceeds to block 406.

At block 406, the user begins entry of freeform characters, which are transmitted by the freeform processor to the multiple sources 321-323. Flow then proceeds to block 408.

At block 408, the multiple source 321-323 are queried simultaneously for suggested freeform entries based upon the characters entered at block 406. Flow then proceeds to block 410.

At block 410, freeform hits from each of the multiple sources 321-323 are provided to the relevancy controller 324. Flow then proceeds to block 412.

At block 412, the relevancy controller 324 scores all of the freeform hits provided at block 410 using rules that assign higher scores to hits that are deemed more relevant to the user and that assign lower scores to hits that are deemed less relevant to the user. Flow then proceeds to block 414.

At block 414, the relevancy controller 324 sorts the scored hits from highest score to lowest score and discards scored hits greater than a prescribed suggested freeform entries threshold, N. In one embodiment, the threshold comprises 20 suggested freeform entries. Flow then proceeds to block 416.

At block 416, the highest scored N hits are transmitted by the relevancy controller 324 to the freeform parameters processor 311 for presentation to the user. If the number of scored hits is less than N, then that number of hits are transmitted. Flow then proceeds to decision block 418.

At decision block 418, an evaluation is made to determine if the user has selected one of the suggested freeform entries provided at block 416. If not, flow proceeds to block 404 where the user may enter additional discrete parameters, change discrete parameters, enter additional freeform characters, or change freeform characters. The present inventors note that the entry of discrete parameters (block 404) and entry of freeform characters (blocks 406-410) may be reversed. If the users selects one of the suggested freeform entries provided at block 416, then flow proceeds to block 420.

At block 420, the sampling controller 325 executes a query of the parcel database 340 using the provided discrete parameters and selected freeform suggestion. Flow then proceeds to decision block 422, where decision block 422 and blocks 424, 426, 428, and 430 are executed for each geographic area (state, county, township) within a bounded map displayed on the user's client device 101-103.

At decision block 422, an evaluation is made to determine if the number of parcels within any of the geographic areas exceeds the sampling threshold described above. If not, flow proceeds to block 430. If so, then flow proceeds to block 424.

At block 424, the sampling controller 325 directs the parcel database 340 to perform an X-percent sampled search of parcels and return only X percent of the parcels. One embodiment contemplates a 5-percent sampled search. Another embodiment contemplates a 10-percent sampled search. Flow then proceeds to block 426.

At block 426, the X-percent sample of parcel results are aggregated for the geographic region. Flow then proceeds to block 428.

At block 428, the aggregate of parcels for the geographic region is scaled according to the sampling percentage X to generate an estimate of the aggregate of parcels. Flow then proceeds to block 430.

At block 430, the aggregation of parcels (actual or estimated) is provided by the sampling controller 325 to the results processor 313 for display to the user on their client device 101-103.

Figure 5:
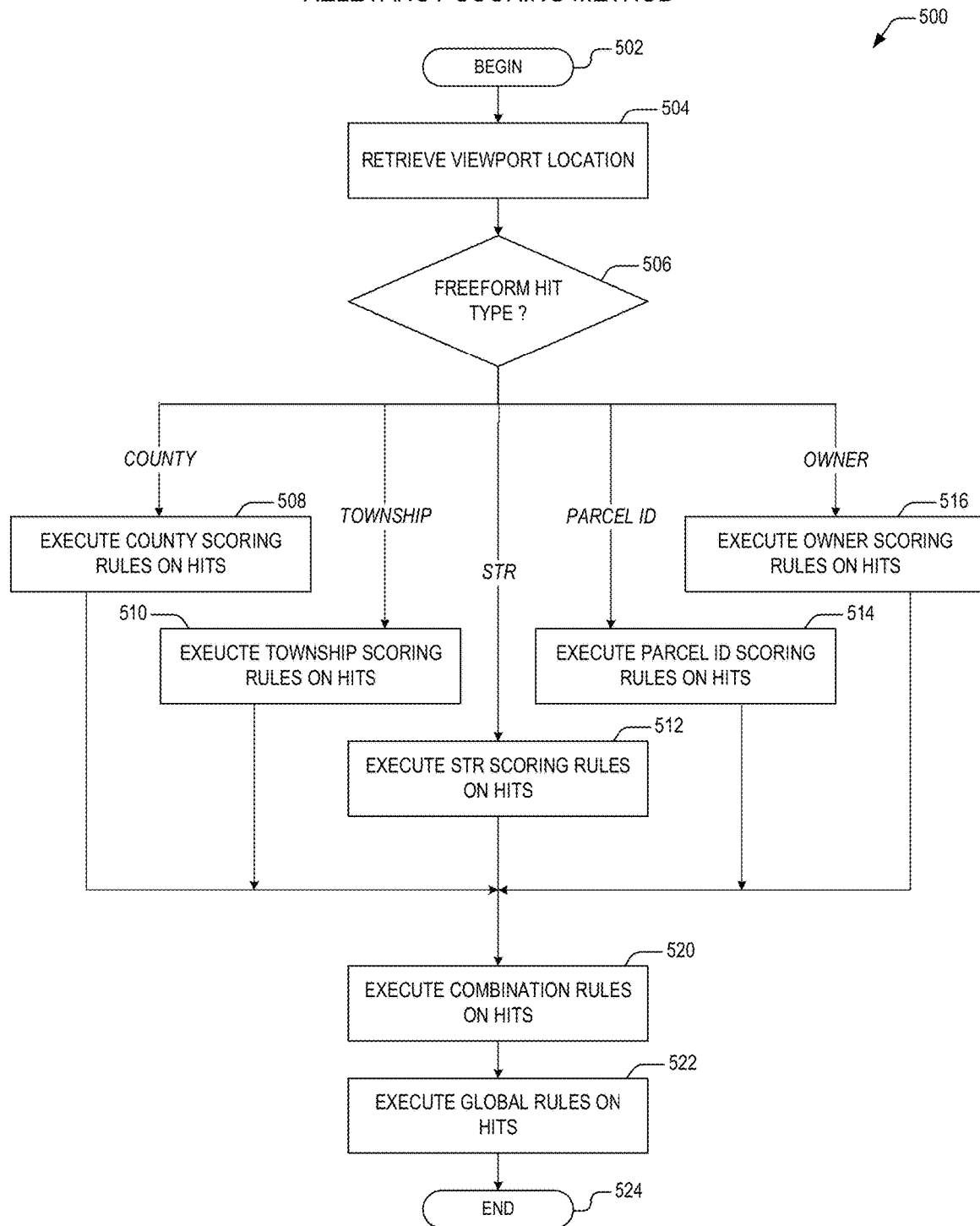
FIG. 5 is a flow diagram illustrating a relevancy scoring method for type ahead results, such as may be employed by the presentation processor of FIG. 3 and the method of FIG. 4.

Referring now to FIG. 5, a flow diagram 500 is presented illustrating a relevancy scoring method for type ahead results, such as may be employed by the presentation processor of FIG. 3 and the method of FIG. 4. Flow begins at block 502, where the user enters one or more freeform characters, which are provided to the multiple sources 321-323 in parallel. Flow then proceeds to block 504.

At block 504, the user's viewport location is retrieved from the viewport location processor 314 and is provided to the in-memory cache 321. The in-memory cache 321 may also provide this viewport location to the relevancy controller 324 for use in determining which freeform hits are more or less relevant to the user. Flow then proceeds to decision block 506.

At decision block 506, an evaluation is made to determine what type of freeform suggestion hit has been provided to the relevancy controller by one or more of the sources 321-323. If a county hit is determined, then flow proceeds to block 508. If a township hit is determined, then flow proceeds to block 510. If a PLSS coordinate hit (section/township/range) hit is determined, then flow proceeds to block 512. If a parcel ID hit is determined, then flow proceeds to block 514. If an owner name hit is determined, then flow proceeds to block 516. For each type of hit, a label is constructed that has more text than just the name of the hit itself. For a hit "Hennepin County," the constructed label is "Hennepin County, Minn.". For a township hit, "Woodville," the constructed label is "Woodville Township, Waseca County, Minn.". Each hit type (parcel ID, owner, county, township, PLSS coordinate, street, intersection, city, state) has its own label format.

At block 508, the relevancy controller 324 executes county scoring rules on freeform hits. For county hits, a hit is given a higher ranking if a state abbreviation or name prefix also appears as one of the freeform search tokens. Hits are ranked higher if the token "County" follows the token(s) that match a prefix of the county name. Hits are ranked even higher if the token(s) match the full county name. Hits are ranked even yet higher if the viewport location indicates that the user is currently zoomed on a small region of the country and a token matches a county appearing in the region. Hits are ranked additionally higher if the center of the map viewport is closer to the county than another county that may also be matched. Finally, hits are ranked highest if the county name consists of multiple words, and the search text matches multiple words but not necessarily the full county name. One or more of the above conditions may apply to a county hit. Once the input tokens are completely scanned for county matches, the county rules apply a score to all possible contending counties. Flow then proceeds to block 520.

At block 510, the relevancy controller 324 executes township scoring rules on freeform hits. Township hits are ranked in the same manner as county hits, as described above with reference to block 508. Because townships are far more numerous than counties, additional rules are executed. Tokens in the search text are viewed as tokens that when treated as a county name prefix and a township name prefix produce a unique township hit. For instance, "Washington" is a very common township name across the United States, but when combined with the county name "Anderson", there is only a single hit across the country. Accordingly, the in-memory cache 321 includes an index for a combination of township and county name prefixes, which helps to narrow down a correct township in an acceptable time period. Flow then proceeds to block 520.

At block 512, the relevancy controller 324 executes PLSS scoring rules on freeform hits. Since PLSS coordinates comprise precise characters (e.g., "S24, T32N, R18E"), PLSS hits are initially scored very high. Flow then proceeds to block 520.

At block 514, the relevancy controller 324 executes parcel ID scoring rules on freeform hits. Parcel ID hits are increased score if a search token matches (or partially matches) a parcel ID in the parcel index 322. Flow then proceeds to block 520.

At block 516, the relevancy controller 324 executes owner name scoring rules on freeform hits. Owner name hits are increase in score if a search token matches (or partially matches an owner name in the parcel index 322. Flow then proceeds to block 520.

At block 520, the relevancy controller 324 executes combination rules on the initially scored hits provided at blocks 508, 510, 512, 514, and 516. Results from the three sources are combined by assigning scores and boosting the scores in certain cases. A scored hit's scored is increase one point for every term that matches the label that is computed for the particular result type. Beyond that, county hit scores are increased slightly, because they are deemed more relevant to the user. If all search terms match a corresponding label for that hit type, an additional point is added. PLSS coordinates get increased higher than other hits due to their specificity, and the relevancy processor 324 deems that the user is performing a targeted PLSS coordinates search. If there are too many townships or counties found for the given search text, then the score of all township or county hits is reduced because the relevancy controller 324 deems that it is less likely that the user was trying to find a particular county or township. Flow then proceeds to block 522.

At block 522, the relevancy controller 324 finds those hits having the same score and applies global ordering rules to those same-scored hits to rank them according to user relevancy, where the global ordering rules are determined based upon usability results for the system.

Turning now to FIG. 6, a block diagram is presented illustrating an agricultural search and valuation server 600 according to the present invention, such as the search and valuation server 130 of FIG. 1. The valuation server 600 may include one or more central processing units (CPU) 601 that are coupled to memory 606 having both transitory and non-transitory memory components therein. The CPU 601 is also coupled to a communications circuit 602 that couples the valuation server 600 to the internet cloud 110 via one or more wired and/or wireless links 603. The links 603 may include, but are not limited to, Ethernet, cable, fiber optic, and digital subscriber line (DSL). As part of the network path to and through the cloud 110, providers of internet connectivity (e.g., ISPs) may employ wireless technologies from point to point as well.

The valuation server 600 may also comprise input/output circuits 604 that include, but are not limited to, data entry and display devices (e.g., keyboards, monitors, touchpads, etc.). The memory 606 may be coupled to a parcel database 605 and to databases 121-124 described with reference to FIG. 1 above. Though the valuation server 600 is shown directly coupled to databases 121-124 and 605, the present inventors note that interfaces to these data sources may exclusively be through the communications circuit 602 or may be through a combination of direct interface and through the communications circuit 602, according to the source of data.

The memory 606 may include an operating system 607 such as, but not limited to, Microsoft Windows, Mac OS, Unix, and Linux, where the operating system 607 is configured to manage execution by the CPU 601 of program instructions that are components of one or more application programs. In one embodiment, a single application program comprises a plurality of code segments 608-616 resident in the memory 606 and which are identified as a configuration code segment CONFIG 608, a client communications code segment CLIENT COMM 609, a presentation processor code segment PRESENTATION PROC 610, a web services code segment WEB SERV 611, an agricultural metrics processor code segment AG METRICS PROC 612, a crop simulation processor code segment CROP SIM PROC 613, a valuation processor code segment VALUATION PROC 614, a management practices processor code segment MGMT PROC 615, and a remote sense processor code segment REM SENSE PROC 616.

Operationally, the search and valuation server 1000 600 execute one or more of the code segments 608-616 under control of the OS 607 as required to enable the search and valuation server 600 to ingest new data from external data sources 121-124, to employ data from the sources 121-124 in crop simulations that translate the data into meaningful agricultural metrics and corresponding valuations for approximately 15 million agricultural parcels, and to store these metrics and valuations in the parcel database 605 in a manner that can be rapidly and easily searched and accessed by users that communicate with the search and valuation server 600 over the communications circuit 602 via client applications 104-106 executing on their respective client devices 101-103. The search and valuation server 600 may further be configured to execute one or more of the code segments 608-616 under control of the OS 607 as required to enable the search and valuation server 600 to format and present suggested freeform entries and subsequent search results and corresponding parcel data to the client applications 104-106 executing on their respective client devices 101-103 with acceptable latencies, and to receive communications therefrom that users specify to narrow search results, to perform new searches altogether, and to specify the relative importance of one or more agricultural metrics relative to other agricultural metrics in order to calculate agricultural valuations of parcels according to relative importance of the agricultural metrics relative to other agricultural metrics.

CONFIG 608 may be executed to place the server 600 into an operational or maintenance mode, where the maintenance mode may be entered to allow for ingestion of new data from the data sources 121-124 via automated or manual means. CLIENT COMM 609 may be executed to perfect reliable transfer of information between the server 600 and client applications 104-106 executing on respective client devices 101-103. PRESENTATION PROC 610 may be executed to suggest freeform parameter entries and to perform searches of the parcel database 605, to provide search results, and to interact with client applications 104-106 executing on respective client devices 101-103 as is described above with reference to FIGS. 1-5. WEB SERV 611 may be executed to provide for formatting of information provided by PRESENTATION PROC 610 for transmission to the client applications 104-106 and for formatting of information that is provided to PRESENTATION PROC 610 which has been received from the client applications 104-106.

AG METRICS PROC 612 may be executed to perform any of the functions and operations described above with reference to the agricultural metrics processor 152 of FIG. 1. CROP SIM PROC 613 may be executed to perform any of the functions and operations described above with reference to the crop simulation processor 153 of FIG. 1. VALUATION PROC 614 may be executed to perform any of the functions and operations described above with reference to the agricultural valuation processor 154 of FIG. 1. MGMT PROC 615 may be executed to perform any of the functions and operations described above with reference to the management practices processor 155 of FIG. 1. And REM SENSE PROC 616 may be executed to perform any of the functions and operations described above with reference to the remote sense processor 156 of FIG. 1.

Figure 7:
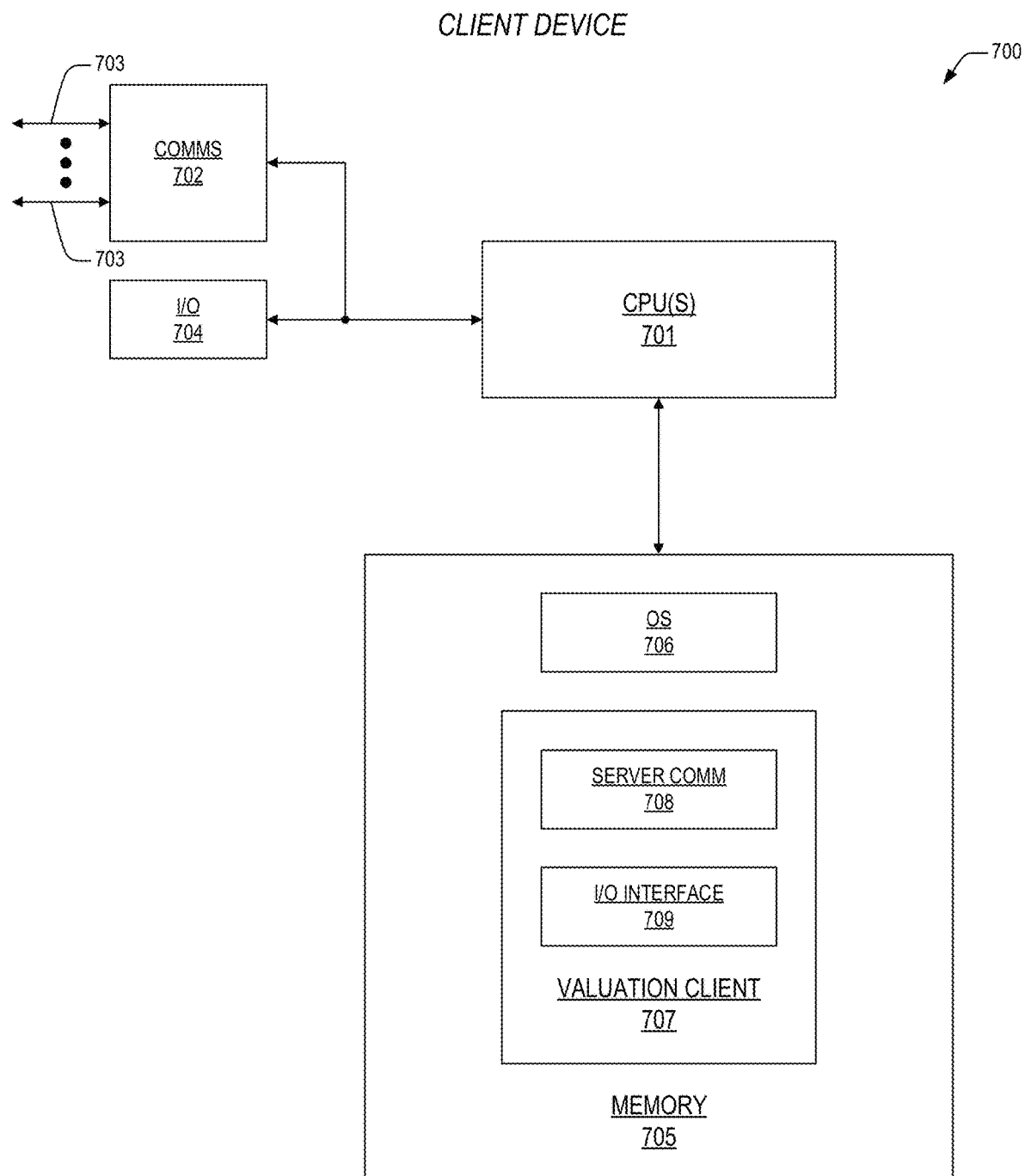
FIG. 7 is a block diagram depicting a client device according to the present invention.

Now referring to FIG. 7, a block diagram is presented depicting a client device 700 according to the present invention, such as the client devices 101-103 discussed above with reference to FIG. 1. The client device 700 may include one or more central processing units (CPU) 701 that are coupled to memory 705 having both transitory and non-transitory memory components therein. The CPU 701 is also coupled to a communications circuit 702 that couples the client device 700 to internet cloud 110 via one or more wired and/or wireless links 703. The links 703 may include, but are not limited to, Ethernet, cable, fiber optic, and digital subscriber line (DSL).

The client device 700 may also comprise input/output circuits 704 that include, but are not limited to, data entry and display devices (e.g., keyboards, monitors, touchpads, etc.).

The memory 705 may include an operating system 706 such as, but not limited to, Microsoft Windows, Mac OS, Unix, Linux, iOS, and Android OS, where the operating system 706 is configured to manage execution by the CPU 701 of program instructions that are components of a valuation client application program 707. In one embodiment, the client application program 707 comprises a server communications code segment SERVER COMM 708 and an I/O interface code segment I/O INTERFACE 709.

When executing on the client device 700, the client 707 provides for display of information provided by the search and valuation server 130, 600 on the input/output circuits 704 that help a user make decisions regarding which freeform/discrete parameters to specify in order to perform searches of the parcel database 151, 605. The SERVER COMM 708 segment may execute to receive this information and the I/O INTERFACE segment 709 may execute to transmit this information to the input/output circuit 704. Likewise, the client 707 provides for input of freeform and discrete search parameters provided by the user via the input/output circuit 704 for transmission to the search and valuation server 130, 600 that direct the server 130, 600 to refine an ongoing search in order to narrow down a number of parcels that satisfy the search parameters, and to specify freeform and discrete parameters that direct the server 130, 600 to perform new searches altogether. The SERVER COMM 608 segment may execute to transmit this information and the I/O INTERFACE segment 609 may execute to receive this information to the input/output circuit 604.

The functions and operations described above with reference to the search and valuation server 130, 600 according to the present invention result in a significant improvement in this field of technology by providing a superior technique for translating massive amounts of agricultural data for millions of parcels into agriculturally meaningful metrics and corresponding agricultural valuations and that aggregate the metrics and valuation along with public and commercial sales data for these parcels into detailed parcel reports that are displayed on client devices 101-103, 1100. In one embodiment, data corresponding to the detailed parcel reports are stored in the parcel database 151 for all agricultural parcels in the continental United States, approximately 15 million parcels. The parcel report is the culmination all of the functions and operations described above and includes a combination of data from public datasets, commercial datasets, management practices inference, remote sensing inference, crop simulation results, and final metric and agricultural algorithmic results. In one embodiment, to enable a search interface for users with acceptable latencies, the search and valuation server 130, 600 indexes key pieces of the data within the parcel database 151 into a full-text search engine (i.e., Elasticsearch engine) with multi-source type ahead components that are simultaneously accessed for freeform hits, where the freeform hits ranked and displayed to the user according to their relevancy based upon freeform characters entries along with the user's viewport location. This allows users to filter through millions of parcels to retrieve those which fit their particular search criteria with sub-second freeform suggestion and search response times. Exemplary client device displays will now be presented with reference to FIGS. 8-13 that show how exemplary parcel data is presented to a user, how exemplary freeform and discrete search parameters are input by the user for transmission to the search and valuation server 130, 600, how aggregation of parcel results are sampled and normalized, how suggest freeform entries are ranked, and how information is displayed to the user along with geographic contextual information.

Figure 8:
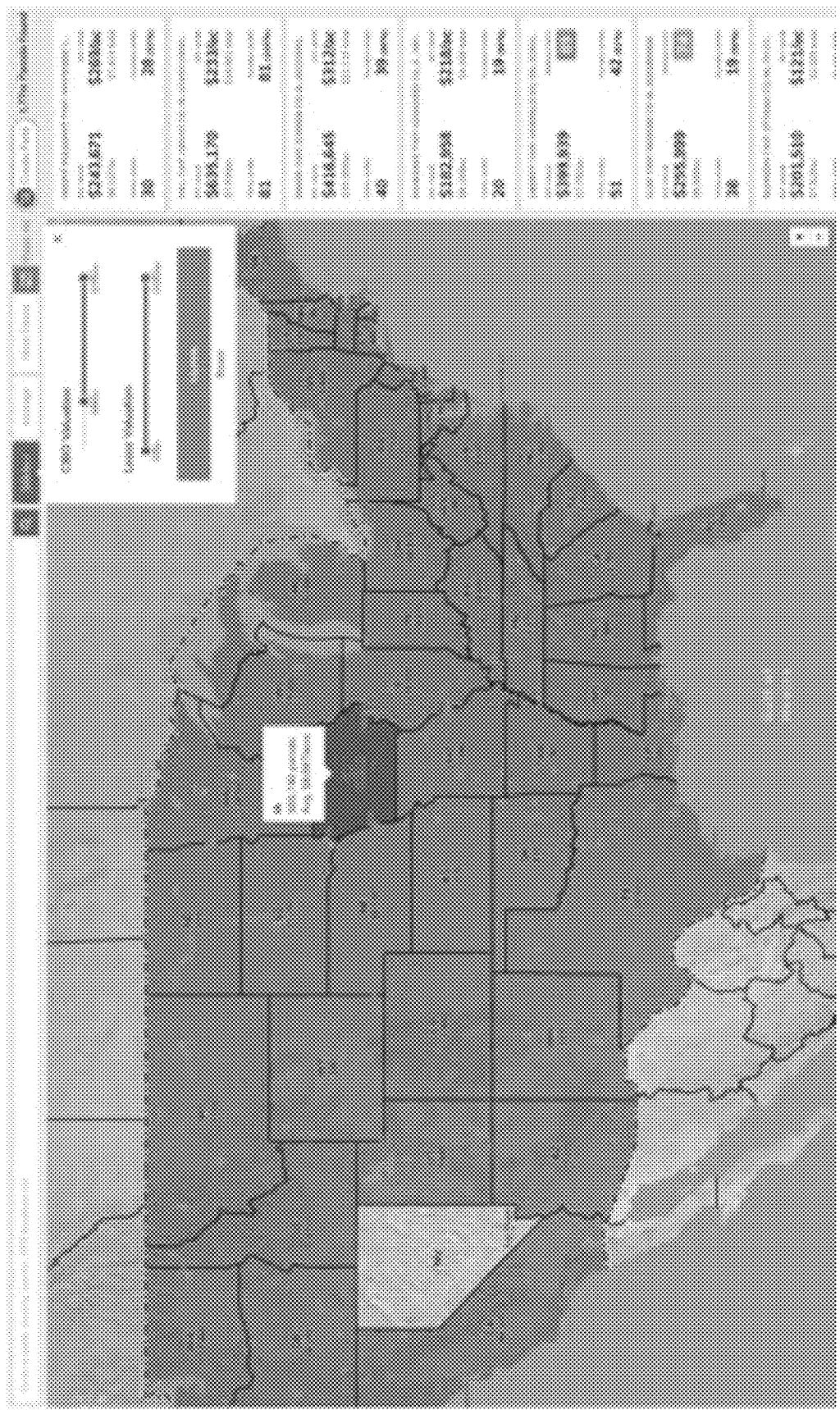
FIG. 8 is a diagram detailing an exemplary display provided to a client device showing search results (parcels) having valuations greater than $6,000 per acre, where the results are sampled and aggregated by state.

Turning now to FIG. 8, a diagram 800 is presented detailing an exemplary display provided to a client device 101-103 showing search results (parcels) having valuations greater than $6,000 per acre, where the results are sampled and aggregated by state. As described above, when the number of aggregated parcels for any geographic region within the map boundaries of the displayed area exceeds the prescribed sampling threshold, then the sampling controller 325 executes a sampled query of the parcel database 340 and then scales the sampled results to estimate the number of parcels within each of the geographic regions displayed. Note that the number of parcels displayed within each state (under the 2-letter state abbreviation) that meet the specified valuation criteria are all multiples of 10, thus indicating that 10 percent of the parcels were sampled that meet the criteria.

Figure 9:
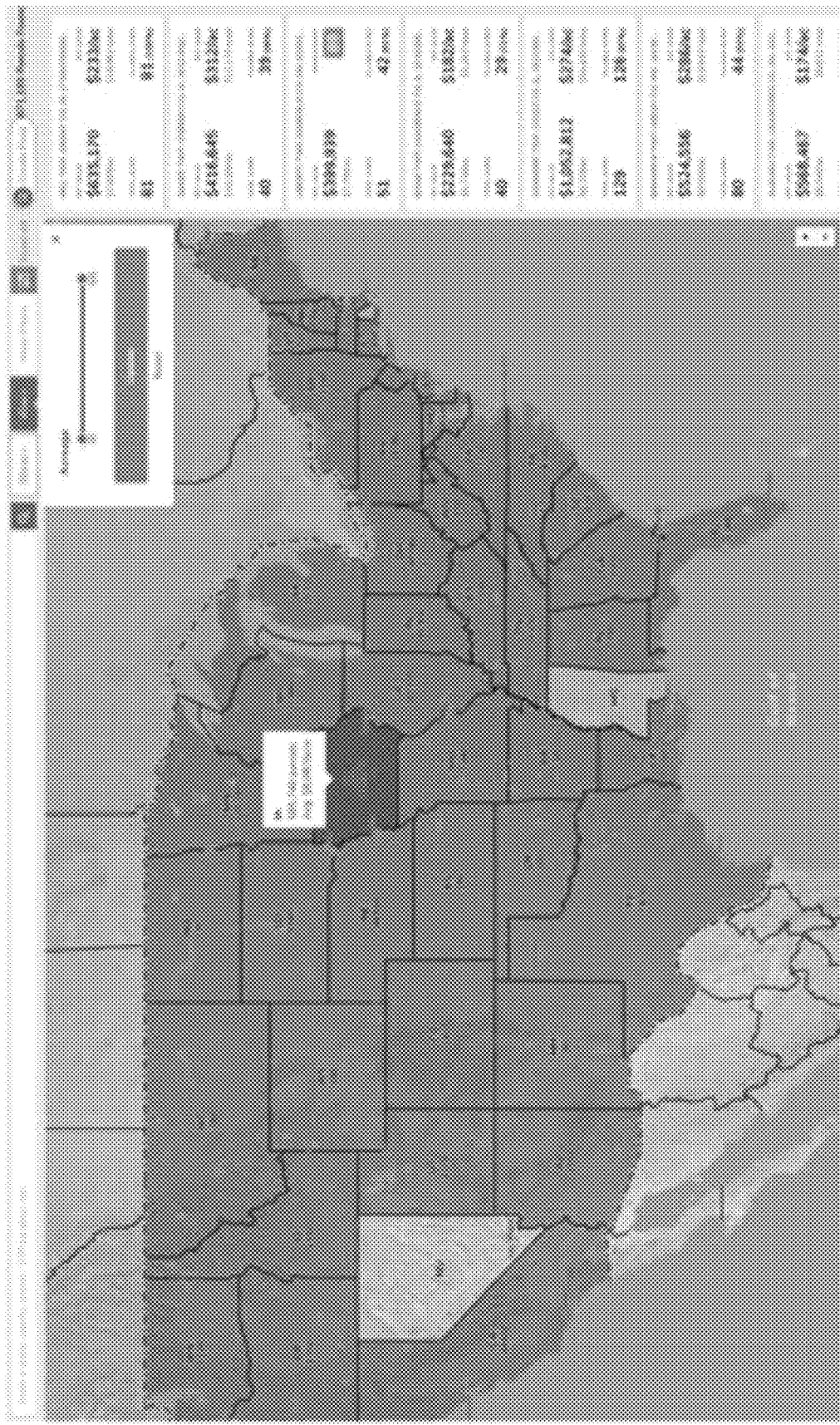
FIG. 9 is a diagram detailing an exemplary display provided to a client device showing search results (parcels) additionally having acreages greater than 40 acres, where the results are sampled and aggregated by state.

Referring now to FIG. 9, a diagram 900 is presented detailing an exemplary display provided to a client device 101-103 showing search results (parcels) additionally having acreages greater than 40 acres, where the results are sampled and aggregated by state. In this instance, the user retained the valuation criteria (greater than $6,000 per acre) and added a discrete parameter that the parcels have acreages greater than 40 acres. Like the display of FIG. 9, the number of aggregated parcels for any geographic region within the map boundaries of the displayed area exceeds the prescribed sampling threshold, and the sampling controller 325 executes a sampled query of the parcel database 340 and then scales the sampled results to estimate the number of parcels within each of the geographic regions displayed. Like FIG. 8, FIG. 9 shows that the number of parcels displayed within each state (under the 2-letter state abbreviation) that meet the specified valuation criteria are all multiples of 10, thus indicating that 10 percent of the parcels were sampled that meet the criteria.

Figure 10:
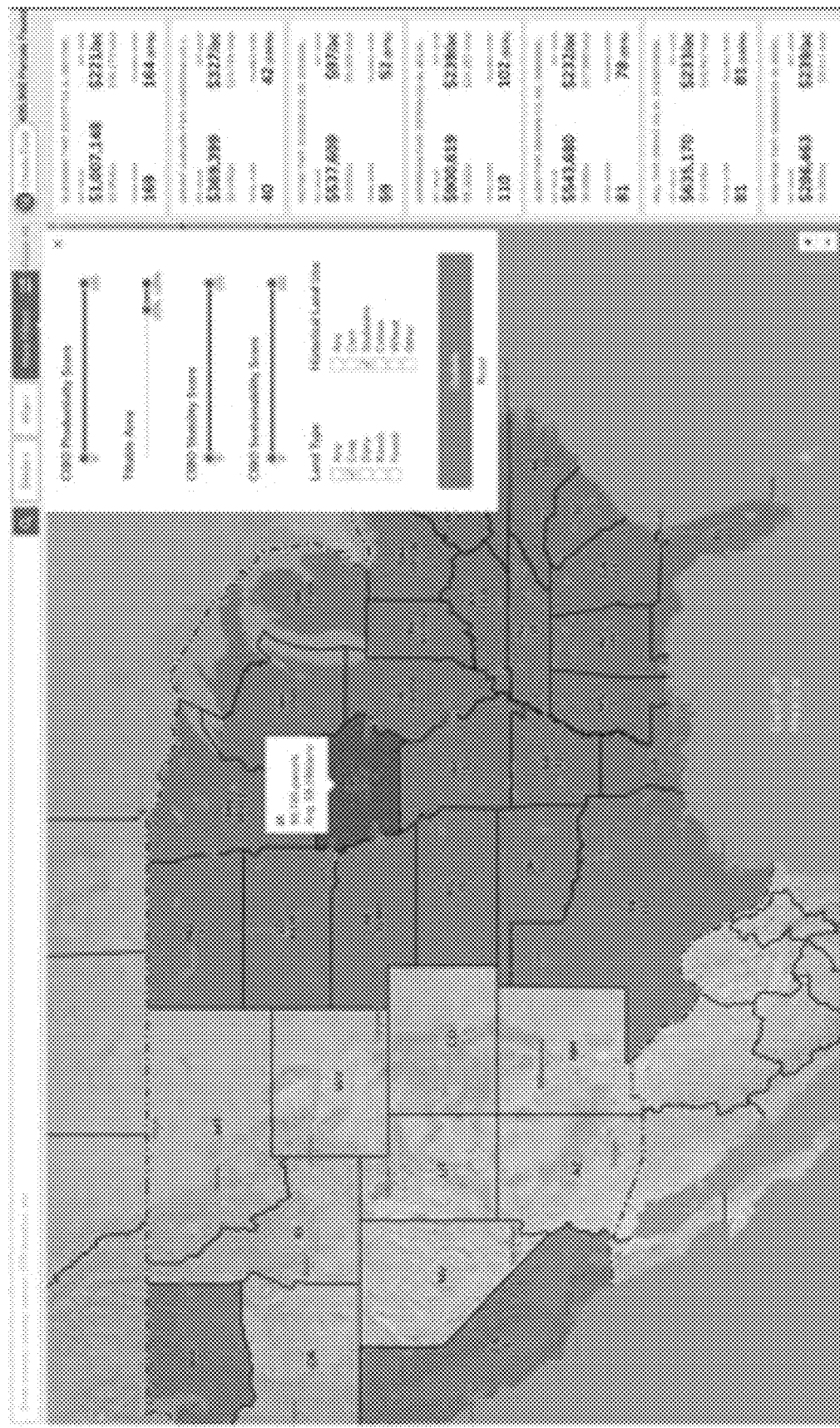
FIG. 10 is a diagram an exemplary display provided to a client device showing search results (parcels) additionally having tillable areas between 85 and 100 percent and having historical soybean crops, where the results are not sampled and aggregated by state.

Now turning to FIG. 10, a diagram 1000 is presented showing an exemplary display provided to a client device 101-103 showing search results (parcels) additionally having tillable areas between 85 and 100 percent and having historical soybean crops, where the results are not sampled and aggregated by state. In this instance, the user retained the valuation criteria (greater than $6,000 per acre) and acreage criteria (greater than 40 acres), and added a discrete parameter that the parcels have tillable areas between 85 and 100 percent and have historical soybean crops. In this case, the number of aggregated parcels for all geographic regions within the map boundaries of the displayed area fall below the prescribed sampling threshold, and the sampling controller 325 executes a full query of the parcel database 340 and displays the exact number of parcels found within each of the geographic regions that meet the specified criteria.

Figure 11:
FIG. 11 is a diagram depicting an exemplary display provided to a client device showing search results (parcels) having valuations greater than $6,000 per acre, where the results are sampled and aggregated by county within the state of Iowa.

Now referring to FIG. 11, a diagram 1100 is presented depicting an exemplary display provided to a client device 101-103 showing search results (parcels) having valuations greater than $6,000 per acre, where the results are sampled and aggregated by county within the state of Iowa. In this case, the user has drilled down in the national map of FIG. 8 to display counties within the state of Iowa, along with surrounding counties falling within the boundaries of the displayed map. As described above, when the number of aggregated parcels for any geographic region within the map boundaries of the displayed area exceeds the prescribed sampling threshold, then the sampling controller 325 executes a sampled query of the parcel database 340 and then scales the sampled results to estimate the number of parcels within each of the geographic regions displayed. Note that the number of parcels displayed within each county (under the county label) that meet the specified valuation criteria are all multiples of 10, thus indicating that 10 percent of the parcels were sampled that meet the criteria.

Referring to FIG. 12, a diagram 1200 is presented featuring an exemplary display provided to a client device showing type ahead results for parcels valued at greater than $6,000 per acre having a viewport centroid in Buchanan County, Iowa, where a user has entered the string "buf". The geographic regions displayed are townships within Buchanan County, Iowa, along with surrounding townships falling within the map display boundaries. In this case a hit on Buffalo Township, Buchanan County, Iowa has been found by the in-memory cache 321 and scored higher than all other freeform entry suggestions by the relevancy controller 324.

Finally referring to FIG. 13, a diagram 1300 is presented showing an exemplary display provided to a client device 101-103 showing type ahead results for parcels valued at greater than $6,000 per acre having a viewport centroid in Buffalo Township, Buchanan County, Iowa, where a user has entered the string "flic". In this case, the parcel index 322 has found 3 hits on Flickenger Family Farms, LLC and the relevancy controller 324 has promoted this owner name as the highest ranked freeform entry suggestion.

Portions of the present invention and corresponding detailed description are presented in terms of software or algorithms, and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims. For example, components/elements of the systems and/or apparatuses may be integrated or separated. In addition, the operation of the systems and apparatuses disclosed herein may be performed by more, fewer, or other components and the methods described may include more, fewer, or other steps. Additionally, unless otherwise specified steps may be performed in any suitable order.

Although specific advantages have been enumerated above, various embodiments may include some, none, or all of the enumerated advantages.

What is claimed is:

1. An automated method for search and generation of relevant search results, the method comprising:

receiving freeform search characters input by a user and a viewport location on a displayed geographic area corresponding to an area of interest to the user;

simultaneously searching a first freeform entry source and a second freeform entry source to obtain corresponding first suggested freeform entries and second suggested freeform entries, wherein the first suggested freeform entries correspond to geographic locations that are closer to the viewport location;

ranking the first suggested freeform entries according to first rules of relevancy to the user, and generating first ranked suggested freeform entries;

ranking the second suggested freeform entries according to second rules of relevancy to the user, and generating second ranked suggested freeform entries;

combining the first and second ranked suggested freeform entries into a combined set of suggested freeform entries, and ranking the combined set of suggested freeform entries according to combined rules of relevancy to the user, and generating combined ranked suggested freeform entries; and transmitting the combined ranked suggested freeform entries to the user for selection of a desired type ahead entry.

2. The automated method as recited in claim 1, wherein desired type ahead entry is employed as search criteria to search a parcel database for agricultural parcels that meet the search criteria.

3. The automated method as recited in claim 1, wherein the first freeform entry source comprises an in-memory cache of county names, county abbreviations, county short forms, township names, township abbreviations, and township short forms.

4. The automated method as recited in claim 1, wherein desired type ahead entry is employed as search criteria to search an Elasticsearch parcel database for agricultural parcels that meet the search criteria, and wherein the second freeform entry source comprises a customized indexing of the Elasticsearch parcel database to enable fast lookups on prefixes matching the freeform search characters.

5. The automated method as recited in claim 4, wherein the second suggested freeform entries comprise PLSS coordinates and owner names of the agricultural parcels.

6. The automated method as recited in claim 1, further comprising:

searching a third freeform entry source in parallel with searching of the first freeform entry source and the second freeform entry source to obtain corresponding third suggested freeform entries.

7. The automated method as recited in claim 6, wherein the third freeform entry source comprises a third-party street address and intersection database service that is accessed via the internet cloud.

8. A computer-readable storage medium storing program instructions that, when executed by a computer, cause the computer to perform an automated method for search and generation of relevant search results, the method comprising:

receiving freeform search characters input by a user and a viewport location on a displayed geographic area corresponding to an area of interest to the user;

simultaneously searching a first freeform entry source and a second freeform entry source to obtain corresponding first suggested freeform entries and second suggested freeform entries, wherein the first suggested freeform entries correspond to geographic locations that are closer to the viewport location;

ranking the first suggested freeform entries according to first rules of relevancy to the user, and generating first ranked suggested freeform entries;

ranking the second suggested freeform entries according to second rules of relevancy to the user, and generating second ranked suggested freeform entries;

combining the first and second ranked suggested freeform entries into a combined set of suggested freeform entries, and ranking the combined set of suggested freeform entries according to combined rules of relevancy to the user, and generating combined ranked suggested freeform entries; and transmitting the combined ranked suggested freeform entries to the user for selection of a desired type ahead entry.

9. The computer-readable storage medium as recited in claim 8, wherein the desired type ahead entry is employed as search criteria to search a parcel database for agricultural parcels that meet the search criteria.

10. The computer-readable storage medium as recited in claim 8 wherein the first freeform entry source comprises an in-memory cache of county names, county abbreviations, county short forms, township names, township abbreviations, and township short forms.

11. The computer-readable storage medium as recited in claim 8, wherein the desired type ahead entry is employed as search criteria to search an Elasticsearch parcel database for agricultural parcels that meet the search criteria, and wherein the second freeform entry source comprises a customized indexing of the Elasticsearch parcel database to enable fast lookups on prefixes matching the freeform search characters.

12. The computer-readable storage medium as recited in claim 11, wherein the second suggested freeform entries comprise PLSS coordinates and owner names of the agricultural parcels.

13. The computer-readable storage medium as recited in claim 8, wherein the method further comprises:

searching a third freeform entry source in parallel with searching of the first freeform entry source and the second freeform entry source to obtain corresponding third suggested freeform entries.

14. The computer-readable storage medium as recited in claim 13, wherein the third freeform entry source comprises a third-party street address and intersection database service that is accessed via the internet cloud.

15. An automated system for search and generation of relevant search results, the automated system comprising:

a search component, configured to receive from a user interface component freeform search characters and a viewport location on a displayed geographic area, wherein said freeform search characters are entered by a user, and wherein said viewport location corresponds to an area of interest to said user, said search component comprising:

a first freeform entry source and a second freeform entry source, wherein said search component directs said first freeform entry source and said second freeform entry source to simultaneously obtain corresponding first suggested freeform entries and second suggested freeform entries, wherein said first suggested freeform entries correspond to geographic locations that are closer to said viewport location; and a relevancy controller, coupled to said first and second freeform entry sources, configured to rank said first suggested freeform entries according to first rules of relevancy to said user to generate first ranked suggested freeform entries, and configured to rank said second suggested freeform entries according to second rules of relevancy to said user to generate second ranked suggested freeform entries, and configured to combine said first and second ranked suggested freeform entries into a combined set of suggested freeform entries, and configured to rank said combined set of suggested freeform entries according to combined rules of relevancy to said user to generate combined ranked suggested freeform entries, and configured to transmit said combined ranked suggested freeform entries to said user interface component for selection of a desired type ahead entry by said user.

16. The automated system as recited in claim 15, wherein said desired type ahead entry is employed as search criteria to search a parcel database for agricultural parcels that meet said search criteria.

17. The automated system as recited in claim 15 wherein said first freeform entry source comprises an in-memory cache of county names, county abbreviations, county short forms, township names, township abbreviations, and township short forms.

18. The automated system as recited in claim 15, wherein said desired type ahead entry is employed as search criteria to search an Elasticsearch parcel database for agricultural parcels that meet said search criteria, and wherein said second freeform entry source comprises a customized indexing of said Elasticsearch parcel database to enable fast lookups on prefixes matching said freeform search characters.

19. The automated system as recited in claim 18, wherein said second suggested freeform entries comprise PLSS coordinates and owner names of said agricultural parcels.

20. The computer-readable storage medium as recited in claim 15, wherein said search component further comprises:

a third freeform entry source, wherein said search component directs said third freeform entry source to simultaneously obtain corresponding third suggested freeform entries, wherein said third freeform entry source comprises a third-party street address and intersection database service that is accessed via the internet cloud.

* * * * *